US010801191B2

(12) United States Patent  
McHale et al.

(10) Patent No.: US 10,801,191 B2  
(45) Date of Patent: Oct. 13, 2020

(54) MULTI-CHANNEL PLUMBING PRODUCTS

(71) Applicant: AS America, Inc., Piscataway, NJ (US)

(72) Inventors: James McHale, Hillsborough, NJ (US); Joseph Ientile, Port Murray, NJ (US); Walter Pitsch, Washington, NJ (US); Jean-Jacques L'Henaff, New Canaan, CT (US)

(73) Assignee: AS America, Inc., Piscataway, NJ (US)

( * ) Notice: Subject to any disclaimer, the term of this patent is extended or adjusted under 35 U.S.C. 154(b) by 16 days.

(21) Appl. No.: 16/140,480

(22) Filed: Sep. 24, 2018

(65) Prior Publication Data

US 2019/0024354 A1 Jan. 24, 2019

Related U.S. Application Data

(62) Division of application No. 14/850,561, filed on Sep. 10, 2015, now Pat. No. 10,106,962.
(Continued)

(51) Int. Cl.
*E03C 1/04* (2006.01)
*B22F 3/105* (2006.01)
(Continued)

(52) U.S. Cl.
CPC .......... *E03C 1/0404* (2013.01); *B22F 3/1055* (2013.01); *B22F 5/10* (2013.01);
(Continued)

(58) Field of Classification Search
CPC .. E03C 1/0404; E03C 1/04; Y10T 137/87684; Y10T 137/9464;
(Continued)

(56) References Cited

U.S. PATENT DOCUMENTS 1,721,786 A 7/1929 Morris  
1,981,496 A 11/1934 Buttner  
(Continued)

FOREIGN PATENT DOCUMENTS

FR 2627204 8/1989  
FR 2627204 A1 * 8/1989 ........... G02B 6/0001  
(Continued)

OTHER PUBLICATIONS

Decision for Registration mailed Jun. 22, 2016, directed to JP Application No. 2015-025602; 2 pages.
(Continued)

*Primary Examiner* — David Colon-Morales  
(74) *Attorney, Agent, or Firm* — Morrison & Foerster LLP

(57) ABSTRACT

Novel plumbing products, including faucets, are fabricated, e.g., using metallic 3-dimensional or other 3-D printing techniques, to have complex geometries, such as multiple channels that may diverge and re-converge near the spout. The geometries of the various channels can resemble interwoven net-like patterns that define various shapes between the channels. The plumbing fixtures may be formed from one or more of stainless steels, INCONEL, brass, bronze, polycarbonate, PVC, acrylics, rigid polyolefins, PET, carbon fiber, AES, or other plumbing fitting suitable corrosion resistant materials. In some embodiments, the handles of an exemplary faucet can include the same or a similar multiple channel configuration as the spout, providing an advantageously, aesthetically pleasing faucet system. In exemplary embodiments, faucet spouts and their handles are formed so as to couple to standard faucet underbodies, standard valve platforms, or standard threaded hose/waterway connections.

11 Claims, 19 Drawing Sheets

Related U.S. Application Data

(60) Provisional application No. 62/048,678, filed on Sep. 10, 2014.

(51) Int. Cl.
    | | |
    |---|---|
    | *B33Y 80/00* | (2015.01) |
    | *B22F 5/10* | (2006.01) |
    | *B29C 64/153* | (2017.01) |
    | *B29L 23/00* | (2006.01) |
    | *B33Y 10/00* | (2015.01) |
    | *B29K 105/00* | (2006.01) |

(52) U.S. Cl.
    CPC ............ *B29C 64/153* (2017.08); *B33Y 80/00* (2014.12); *E03C 1/04* (2013.01); *B29K 2105/251* (2013.01); *B29L 2023/00* (2013.01); *B33Y 10/00* (2014.12); *Y02P 10/295* (2015.11); *Y10T 137/87684* (2015.04); *Y10T 137/9464* (2015.04)

(58) Field of Classification Search
    CPC ........... Y10T 137/87153; B29C 64/153; B29L 2023/00; B22F 5/10; B22F 3/1055; B33Y 80/00; B33Y 10/00; B29K 2105/251; Y02P 10/295
    See application file for complete search history.

(56) References Cited

U.S. PATENT DOCUMENTS

| | | | |
|---|---|---|---|
| 1,984,999 A | 12/1934 | Stoddard | |
| 2,591,991 A | 4/1952 | Young | |
| 2,928,422 A | 3/1960 | Hunsinger | |
| 3,410,487 A | 11/1968 | Hyde | |
| D220,101 S | 3/1971 | Brown et al. | |
| 3,575,208 A | 4/1971 | Urban | |
| 3,686,733 A | 8/1972 | Ponsa | |
| 3,726,318 A | 4/1973 | Hyde | |
| D231,229 S | 4/1974 | Du Bois | |
| 3,804,117 A | 4/1974 | Collignon | |
| 3,974,858 A | 8/1976 | Nielsen | |
| 3,998,240 A | 12/1976 | Liautaud | |
| D249,155 S | 8/1978 | Doman | |
| 4,126,296 A | 11/1978 | Skor et al. | |
| 4,222,410 A | 9/1980 | Geimer | |
| 4,607,659 A | 8/1986 | Cole | |
| D292,226 S | 10/1987 | Hill | |
| D304,225 S | 10/1989 | Lathrop | |
| 4,961,154 A | 10/1990 | Pomerantz et al. | |
| 4,986,303 A | 1/1991 | Kennedy | |
| 5,123,445 A | 6/1992 | Chung-Shan | |
| 5,131,428 A | 7/1992 | Bory | |
| 5,222,672 A | 6/1993 | Hart et al. | |
| 5,340,656 A | 8/1994 | Sachs et al. | |
| 5,368,071 A | 11/1994 | Hsieh | |
| 5,394,906 A | 3/1995 | Farley | |
| 5,417,348 A | 5/1995 | Perrin et al. | |
| D378,123 S | 2/1997 | Warshawsky | |
| D380,035 S | 6/1997 | Wagner | |
| 5,673,724 A | 10/1997 | Abel | |
| 5,960,490 A | 10/1999 | Pitsch | |
| 6,019,130 A | 2/2000 | Rump | |
| D421,489 S | 3/2000 | Fabian | |
| D437,631 S | 2/2001 | Robbins | |
| 6,214,279 B1 | 4/2001 | Yang et al. | |
| 6,729,344 B1 | 5/2004 | Hung | |
| D490,880 S | 6/2004 | Lin | |
| 6,817,379 B2 | 11/2004 | Perla | |
| 6,912,741 B1 * | 7/2005 | Noh | ........................ B05B 1/169 239/17 |
| 6,936,212 B1 | 8/2005 | Crawford | |
| D512,129 S | 11/2005 | Gilbert | |
| D516,185 S | 2/2006 | Hanna | |
| 7,090,154 B2 | 8/2006 | Herring | |
| 7,096,879 B2 | 8/2006 | Yardley | |
| 7,111,640 B2 | 9/2006 | Rhodes | |
| D531,281 S | 10/2006 | Castellanos | |
| 7,155,759 B2 | 1/2007 | Milne | |
| 7,216,663 B2 | 5/2007 | Vu | |
| 7,225,828 B2 | 6/2007 | Giagni, Jr. et al. | |
| 7,278,446 B2 | 10/2007 | Eriksen | |
| 7,406,980 B2 | 8/2008 | Pinette | |
| 7,445,024 B2 | 11/2008 | Paterson et al. | |
| D630,712 S | 1/2011 | Tippens | |
| 8,028,714 B2 | 10/2011 | Chen | |
| 8,267,114 B1 | 9/2012 | Chen | |
| 8,407,828 B2 | 4/2013 | Vogel et al. | |
| D692,101 S | 10/2013 | Yu | |
| D692,108 S | 10/2013 | Yu | |
| D756,488 S | 5/2016 | Reinecker | |
| D760,356 S | 6/2016 | Berger | |
| D760,357 S | 6/2016 | Clinel | |
| D760,361 S | 6/2016 | Berger | |
| D760,362 S | 6/2016 | Cline | |
| 9,914,169 B2 | 3/2018 | Ederer | |
| 10,106,962 B2 * | 10/2018 | McHale | ................ E03C 1/0404 |
| 10,179,365 B2 | 1/2019 | Ederer | |
| 2005/0246832 A1 * | 11/2005 | Zoller | ...................... B05B 1/14 4/619 |
| 2008/0178957 A1 | 7/2008 | Thomas et al. | |
| 2009/0120516 A1 | 5/2009 | Paini | |
| 2009/0250127 A1 | 10/2009 | Izzy et al. | |
| 2010/0043898 A1 | 2/2010 | Eckhaus | |
| 2011/0259456 A1 | 10/2011 | Pinette et al. | |
| 2012/0227843 A1 | 9/2012 | Thomas et al. | |
| 2013/0048090 A1 | 2/2013 | Yang | |
| 2013/0139920 A1 | 6/2013 | Wang | |
| 2013/0213509 A1 | 8/2013 | Thomas | |
| 2013/0221115 A1 | 8/2013 | Blattner et al. | |
| 2013/0248005 A1 | 9/2013 | Pitsch et al. | |
| 2014/0069511 A1 | 3/2014 | Rexach et al. | |

FOREIGN PATENT DOCUMENTS

| | | |
|---|---|---|
| GB | 2510498 | 8/2014 |
| JP | 11-315564 | 11/1999 |
| KR | 10-2013-0060178 | 6/2013 |

OTHER PUBLICATIONS

Atlantic Precision, Inc. (2012) "Direct Metal Laser Sintering (DMLS)," located at http://www.atlanticprecision.com/DMLS/ (2 pages).

Decision for Registration mailed Mar. 2, 2016, directed to JP Application No. 2015-025604; 2 pages.

Decision for Registration mailed Mar. 2, 2016, directed to JP Application No. 2015-025600; 2 pages.

Decision for Registration mailed Mar. 2, 2016, directed to JP Application No. 2015-025601; 2 pages.

Decision for Registration mailed Mar. 2, 2016, directed to JP Application No. 2015-025603; 2 pages.

Decision to Grant a Patent dated Nov. 30, 2018, directed to JP Application No. 2017-533713; 6 pages.

Extended European Search Report dated Jun. 6, 2018, directed to EP Application No. 15840670.2; 9 pages.

First Notification to Make Rectification dated Feb. 24, 2016, directed to CN Application No. 201530451474.3; 2 pages.

First Notification to Make Rectification dated Feb. 24, 2016, directed to CN Application No. 201530451527.1; 2 pages.

First Notification to Make Rectification dated Feb. 24, 2016, directed to CN Application No. 201530451665.X; 2 pages.

First first Notification to Make Rectification dated Feb. 24, 2016, directed to CN Application No. 201530451789.8; 2 pages.

First Notification to Make Rectification dated Feb. 25, 2016, directed to CN Application No. 201530451785.X; 2 pages.

First Office Action dated Dec. 3, 2018, directed to CN Application No. 201580058954.0; 18 pages.

Houzz. (Apr. 1, 2014) "Houzz Announces 3-D Furniture Printing," located at http://www.houzz.com/deabooks/25459991/list/houzz-announces-3-d-furniture-printing (5 pages).

(56) References Cited

OTHER PUBLICATIONS

International Search Report and Written Opinion dated Dec. 10, 2015, directed to International Application No. PCT/US2015/049442; 11 pages.
McHale et al., U.S. Office Action dated Dec. 15, 2017, directed to U.S. Appl. No. 14/850,561; 11 pages.
McHale et al., U.S. Office Action dated Jun. 1, 2017, directed to U.S. Appl. No. 14/850,561; 23 pages.
ModernTech. (Apr. 5, 2012) "Rapid Prototyping Services," located at http://www.moderntechmech.com/3D-Printer/rapid-prototyping-services.html (2 pages).
Moon Walker Catalog (Oct. 1, 2010), Toyo Kitchen and Living; 7 pages.
Notice of Allowance dated Oct. 21, 2016, directed to MX Application No. MX/f/2015/003409; 2 pages.
Notice of Allowance dated Oct. 21, 2016, directed to MX Application No. MX/f/2015/003410; 2 pages.
Notice of Allowance dated Oct. 21, 2016, directed to MX Application No. MX/f/2015/003411; 2 pages.
Notice of Allowance dated Oct. 21, 2016, directed to MX Application No. MX/f/2015/003412; 2 pages.
Notice of Allowance dated Oct. 21, 2016, directed to MX Application No. MX/f/2015/003413; 2 pages.
Notice of Allowance dated Oct. 26, 2018, directed to KR Application No. 10-2017-7009321; 4 pages.
Notice of Preliminary Rejection dated Aug. 1, 2018, directed to KR Application No. 10-2017-7009321; 24 pages.
Notification of Registration dated Dec. 10, 2015, directed to EM Application Nos. 002856567-0001-002856567-0005; 7 pages.
Notification to Grant Patent Right for Design dated May 11, 2016, directed to CN Application No. 201530451474.3; 3 pages.
Notification to Grant Patent Right for Design dated May 3, 2016, directed to CN Application No. 201530451527.1; 3 pages.
Notification to Grant Patent Right for Design dated May 3, 2016, directed to CN Application No. 201530451665.X; 3 pages.
Notification to Grant Patent Right for Design dated May 3, 2016, directed to CN Application No. 201530451785.X; 3 pages.
Notification to Grant Patent Right for Design dated May 3, 2016, directed to CN Application No. 201530451789.8; 3 pages.
Office Action dated Jul. 10, 2018, directed to BR Application No. 30 2015 005173-6; 2 pages.
Office Action dated Jul. 10, 2018, directed to BR Application No. 30 2015 005179-5; 2 pages.
Office Action dated Jul. 10, 2018, directed to BR Application No. 30 2015 005198-1; 4 pages.
Office Action dated Jul. 10, 2018, directed to BR Application No. 30 2015 005199-0; 2 pages.
Office Action dated Jun. 5, 2018, directed to BR Application No. 30 2015 005175-2; 2 pages.
Office Action dated Mar. 13, 2018, directed to BR Application No. 30 2015 005173-6; 4 pages.
Office Action dated Mar. 13, 2018, directed to BR Application No. 30 2015 005198-1; 2 pages.
Office Action dated Mar. 13, 2018, directed to BR Application No. 30 2015 005199-0; 2 pages.
Office Action dated Mar. 20, 2018, directed to BR Application No. 30 2015 005179-5; 2 pages.
Office Action dated May 11, 2018, directed to JP Application No. 2017-533713; 14 pages.
Sciaky. (2015). "Electron Beam Additive Manufacturing (EBAM) Technology," located at http://www.sciaky.com/additive-manufacturing/electron-beam-additive-manufacturing-technology. (6 pages).
Sosnovsky, D. et al. (2007) "Al Mashrabiya," located at http:www.imj.org.il/exhibitions/2007/dream-makers/15dsys.html (3 pages).
Xiaolin, G. (Jul. 2014). "3D printer and the future world" Report 17 in Selections of Concluding Reports on Research Project of College Students' National Science General-knowledge Course. Beijing: Science and Technology Literature Publishing House; 9 pages.

* cited by examiner

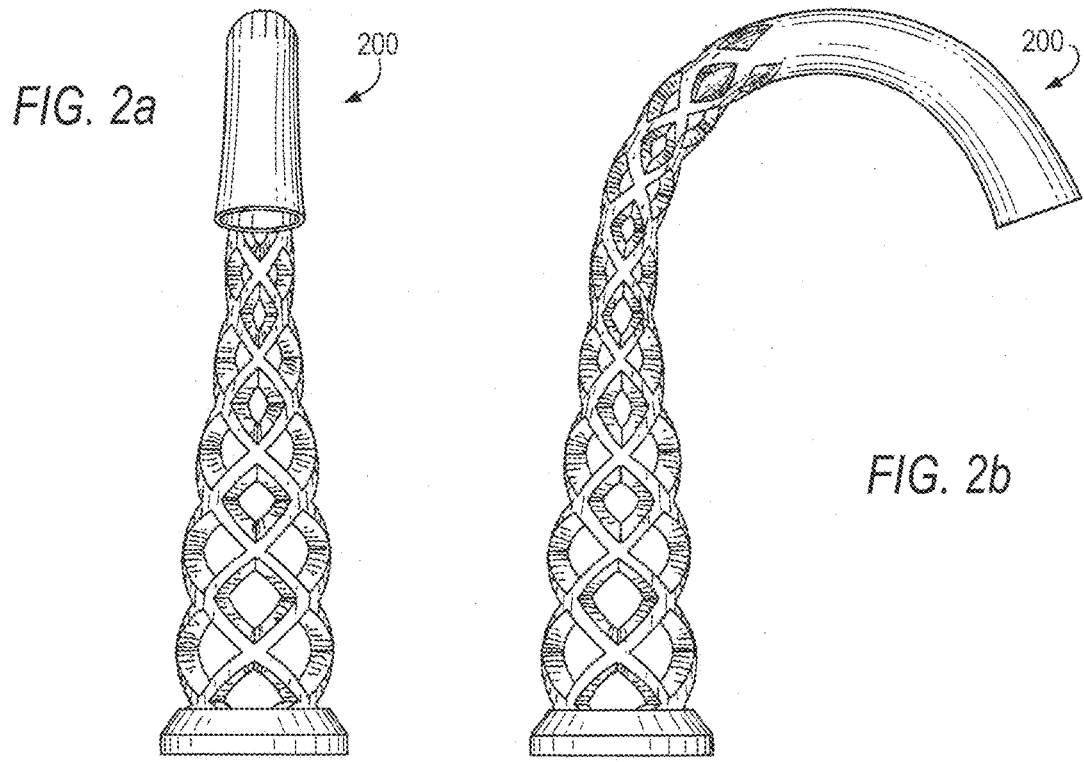
FIG. 2a
FIG. 2b
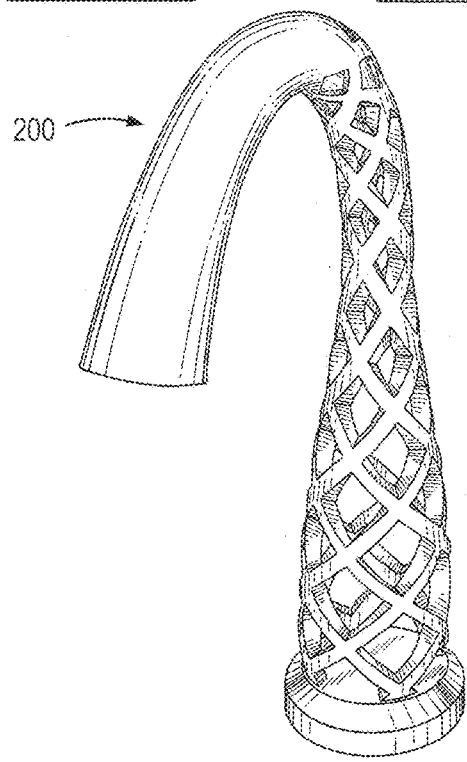
FIG. 2c

FIG. 10c
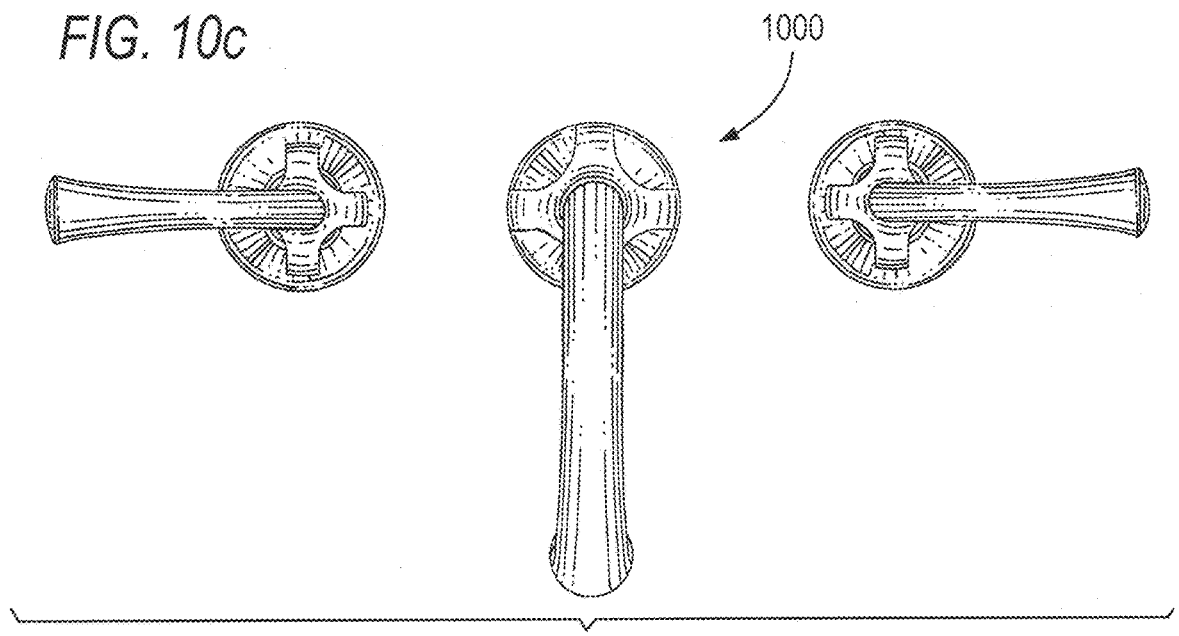
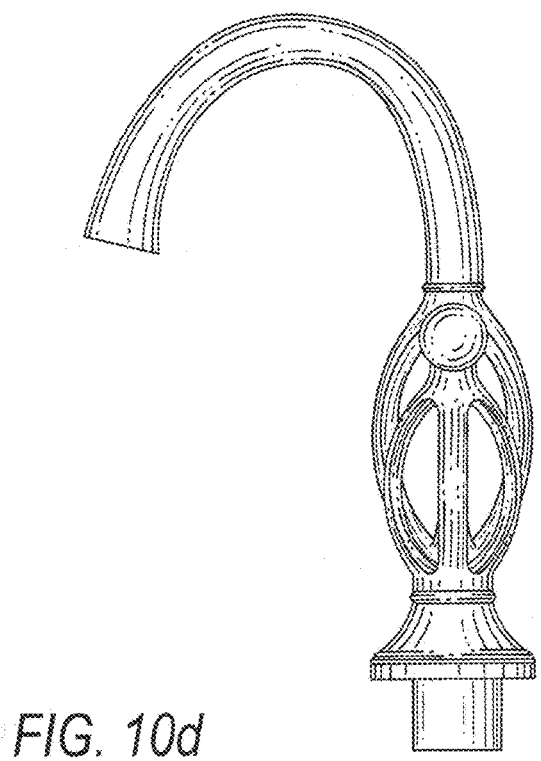
FIG. 10d
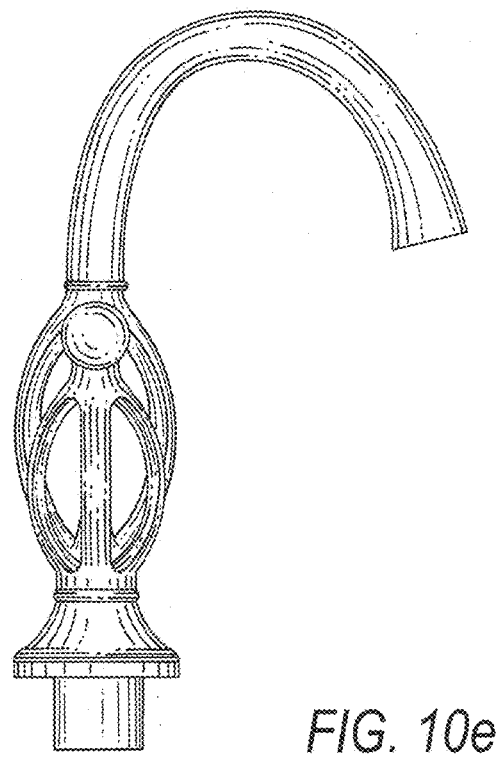
FIG. 10e

FIG. 11a
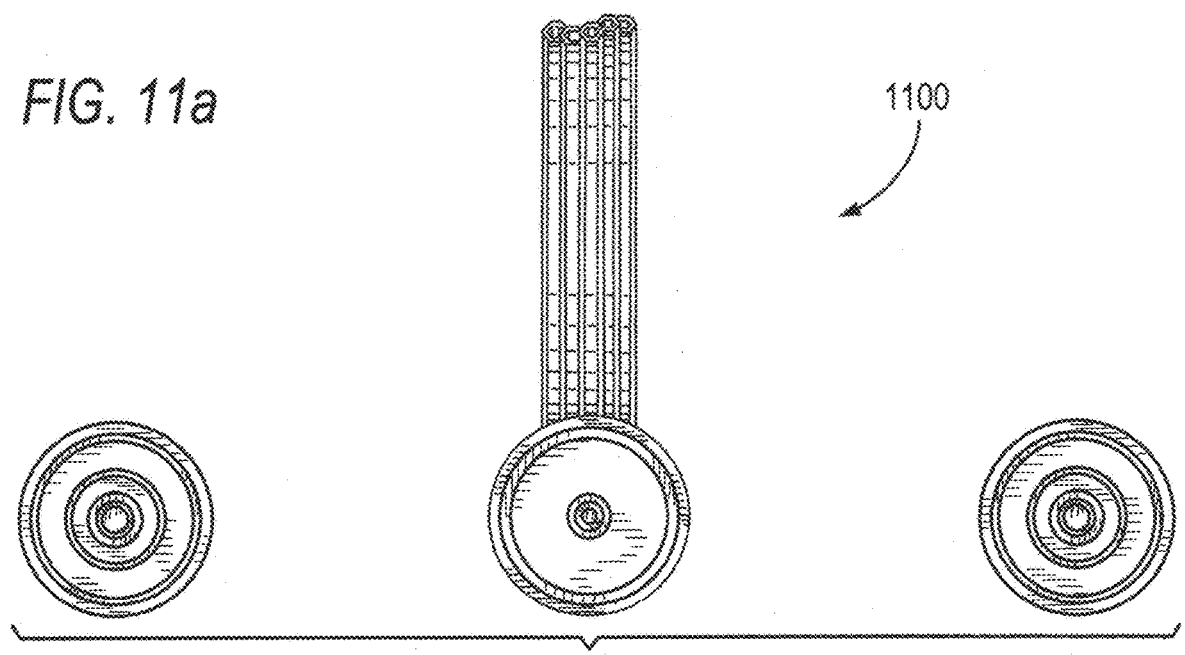
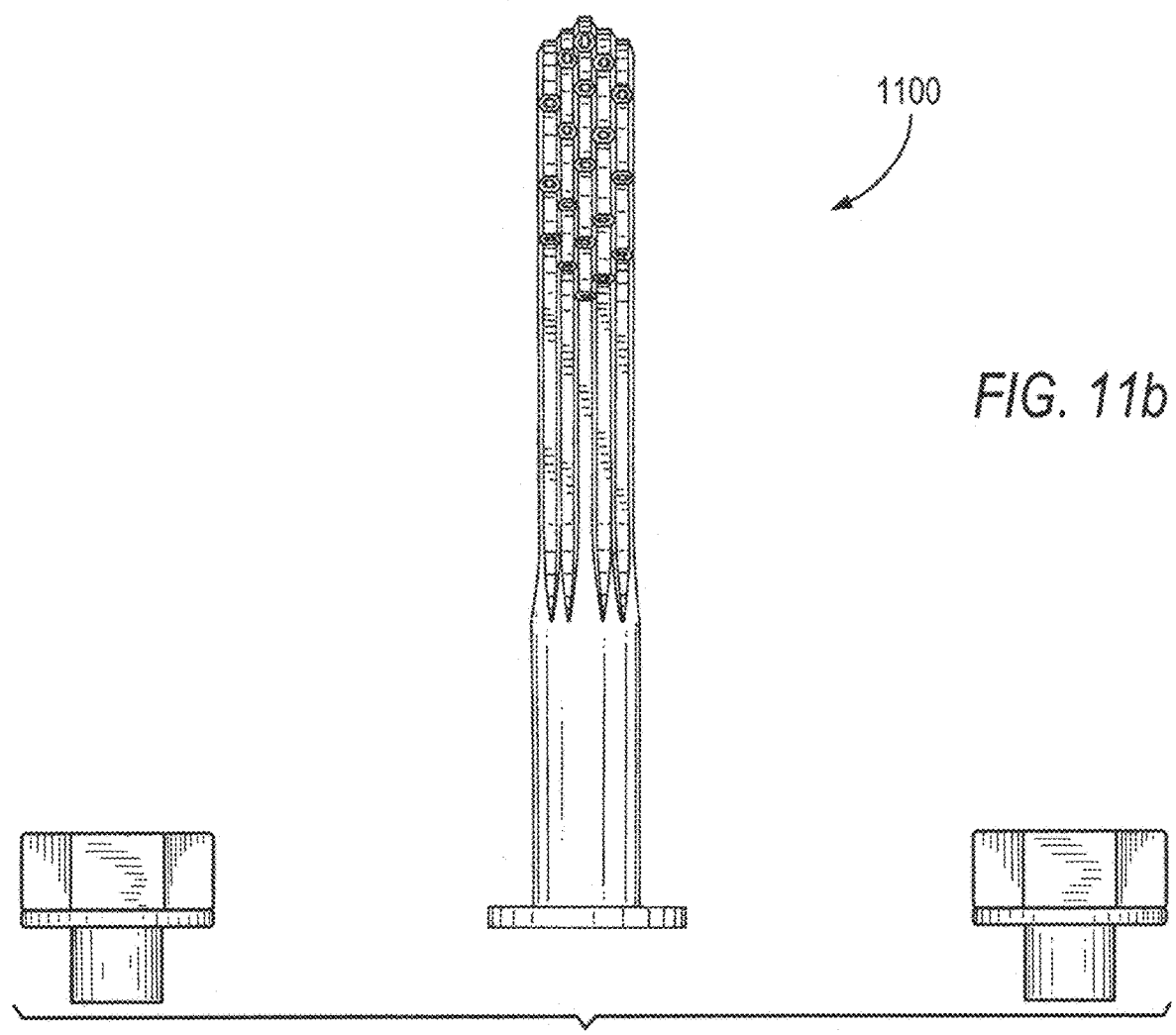
FIG. 11b

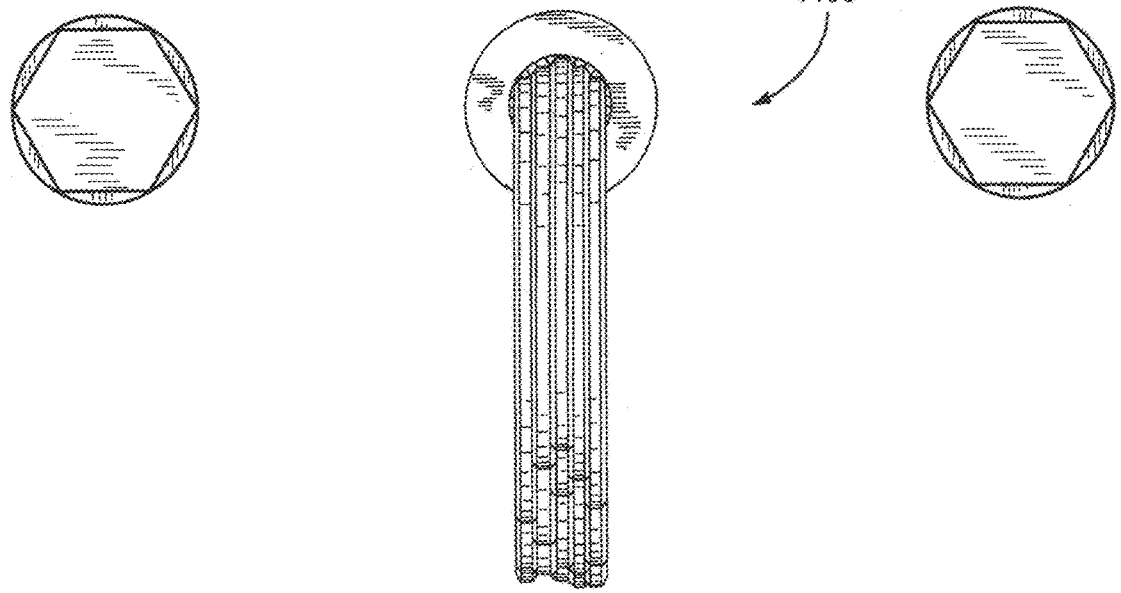
FIG. 11c
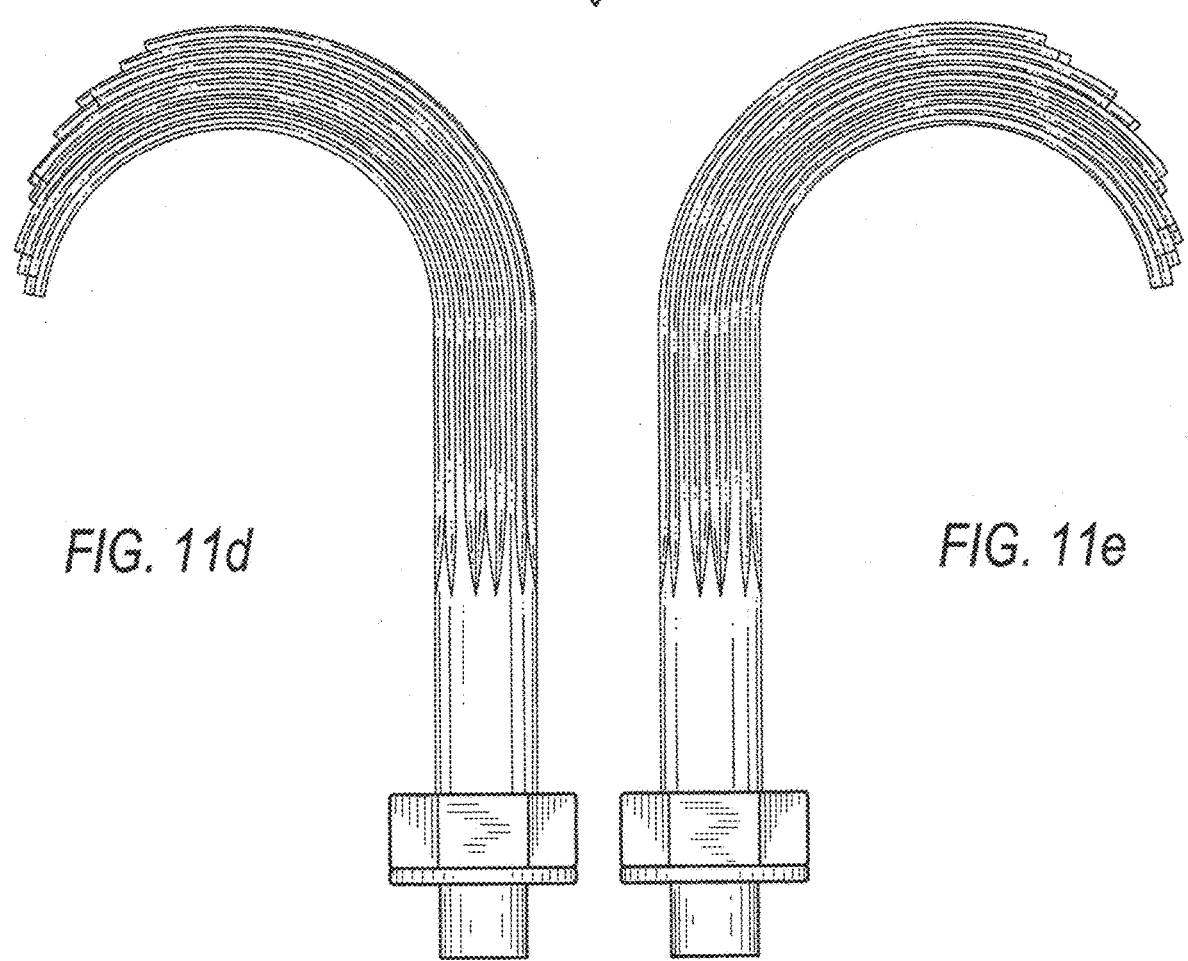
FIG. 11d
FIG. 11e

FIG. 13c
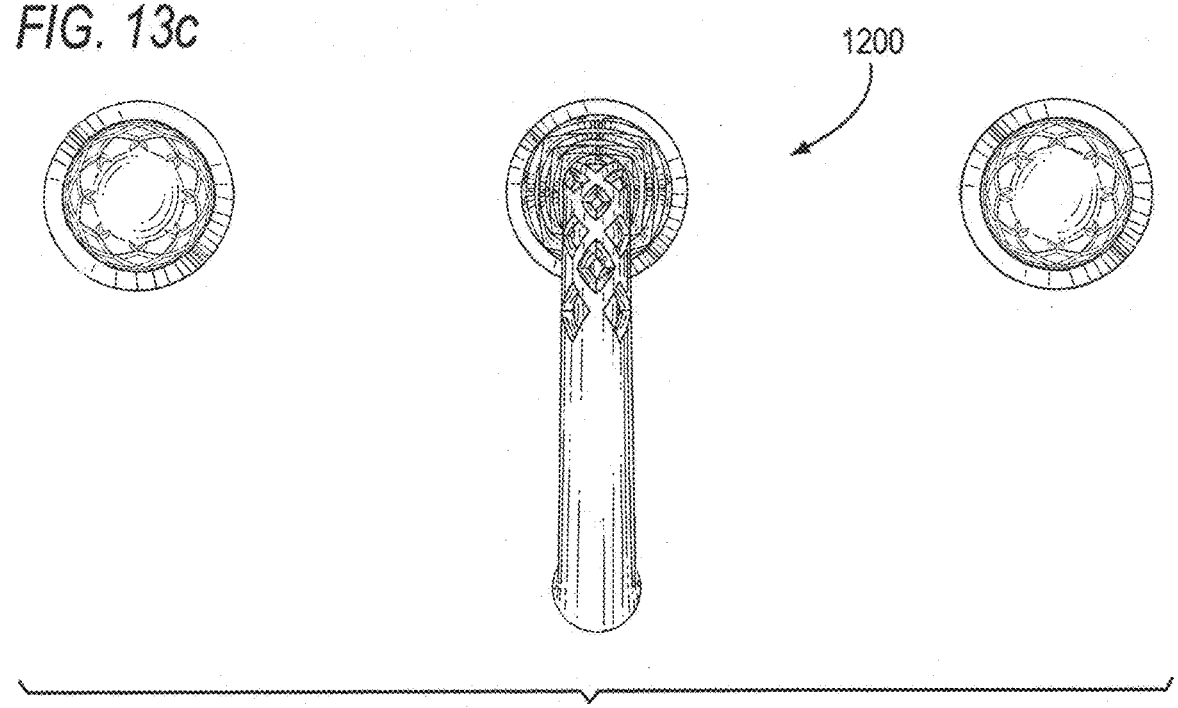
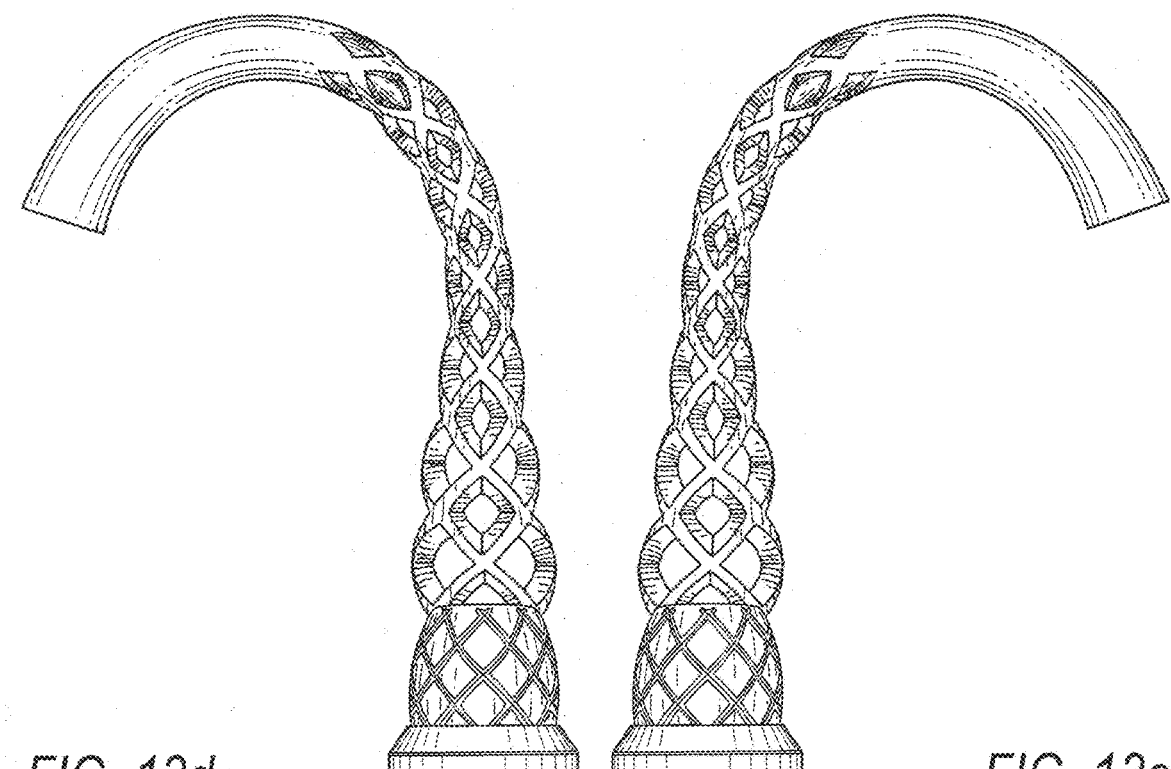
FIG. 13d  FIG. 13e

MULTI-CHANNEL PLUMBING PRODUCTS

REFERENCE TO RELATED APPLICATIONS

This application is a divisional of U.S. patent application Ser. No. 14/850,561, filed Sep. 10, 2015, which claims the benefit of U.S. Provisional Patent Application No. 62/048,678, filed on Sep. 10, 2014, the entire contents of each of which are incorporated herein by reference.

FIELD OF THE INVENTION

The present invention generally relates to faucets and like plumbing products, and in particular to novel plumbing products having complex geometries, including convergent and divergent channels, that can be fabricated using 3-dimensional printing techniques.

BACKGROUND OF THE INVENTION

Faucets are ubiquitous plumbing products having the basic purpose of delivering hot, cold or mixed water from a water supply to a user. Important performance factors of faucets include control of temperature and flow rate, longevity, and absence of leaks, but the faucet has also become an aesthetic showpiece in the décor of a living space, and especially so in a lavatory application. Purchase decisions for lavatory faucets are often made purely on aesthetic design, and the choice of lavatory faucet is often the first decision made in the design of a bathroom. Purchase decisions for other fixtures, fittings, furniture, and accessories (e.g., shower and tub fittings, etc.) are often dictated by the choice of faucet. Thus, the capability to economically produce new, attractive, previously infeasible complex geometries offers a significant competitive advantage in the marketplace.

Conventional faucet fabrication techniques are extremely limited in construction possibilities. Geometries must be amenable to casting processes. That is, geometries are limited to those that can be readily molded and de-molded from a mold. Geometries with multiple undercuts, internal openings or spaces, multiple, small diameter channels, or the like are not possible to form via conventional processes.

What is therefore needed in the art are techniques to leverage cutting edge fabrication processes to expand, and preferably greatly expand, the faucet geometries that can be fabricated.

What is further needed in the art is a palette of new faucet and faucet component constructions that include structurally sound geometries with multiple undercuts, internal openings or spaces, multiple, small diameter channels, in various unique combinations.

SUMMARY OF THE INVENTION

Generally speaking, novel plumbing products, including faucets, are fabricated, e.g., using metallic 3-dimensional or other 3-dimensional printing techniques, to have complex geometries, such as multiple channels that may diverge and re-converge near the spout. The geometries of the various channels can resemble interwoven net-like patterns that define various shapes between the channels, such as a lattice-type faucet defining parallelograms, circles or ovals, or multiple channels defining ellipses or half ellipses as channels diverge and then re-converge. Other embodiments may have fewer channels that diverge at the base of a faucet and re-converge at some distance above, after defining various curved paths at some defined convex curvature.

For example, the geometries of the channels can resemble interwoven net-like patterns. In another embodiment, the handles of an exemplary faucet can also include the same or a similar configuration as the spout, providing an advantageously, aesthetically pleasing faucet system.

The plumbing fixtures may be formed from one or more of stainless steels, INCONEL, brass, bronze, polycarbonate, PVC, acrylics, rigid polyolefins, PET, carbon fiber, AES, or other plumbing fitting suitable corrosion resistant materials. In some embodiments, the handles of an exemplary faucet can include the same or a similar multiple channel configuration as the spout, providing an advantageously, aesthetically pleasing faucet system. In exemplary embodiments, faucet spouts and their handles are formed so as to couple to standard faucet underbodies, standard valve platforms, or standard threaded hose/waterway connections.

Still other objects and advantages of the present invention will in part be obvious and will in part be apparent from the disclosure.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

For a fuller understanding of the inventive embodiments, reference is had to the following description taken in connection with the accompanying drawings in which:

FIGS. 2a-2c depict side, front and perspective views, respectively, of an exemplary faucet spout according to an embodiment of the present invention;

FIG. 8b is a side view of the faucet system of FIG. 8a;

FIG. 9b is a side view of the faucet system of FIG. 9a;

FIGS. 10a-10e depict bottom, side, front and top views of an alternative faucet system according to an embodiment of the present invention similar to the embodiment shown in FIGS. 8a and 8b;

FIGS. 11a-11e depict bottom, side, front and top views of another exemplary multi-channel faucet system according to an embodiment of the present invention;

FIGS. 13a-13e respectively depict bottom, side, front and top views of the exemplary faucet system of FIGS. 12a-12c.

DETAILED DESCRIPTION OF THE INVENTION

Figure 1A:
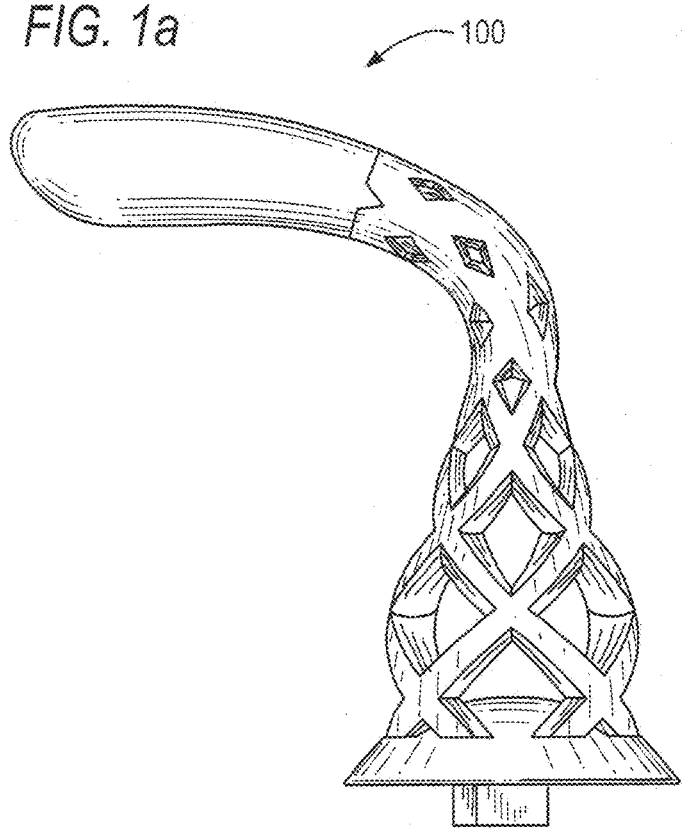
FIGS. 1a-1c depict side, front and perspective views, respectively, of an exemplary faucet handle according to an embodiment of the present invention.

Exemplary embodiments of the present invention leverage advances in 3-dimensional ("3-D") printing. It is noted that metallic and multimedia 3-D printing are relatively recent, cutting-edge processes, which are now used in many industrial applications, including the manufacture of jet engine parts and surgical implants. The present inventors have discovered that 3-D printing of plumbing fixture components, particularly faucet components, can be utilized to produce complex geometries not achievable by conventional plumbing fixture casting or other fabrication technologies, forging, stamping, die-casting, etc. 3-D printing can also be leveraged as an economical manufacturing strategy for low volume plumbing fixture models, such as specialized or custom constructions. Component geometries that are feasible to produce by conventional approaches can also be produced by 3-D printing, which eliminates tooling and start-up costs, making production runs of limited quantities more economical.

Complex and aesthetically interesting plumbing fixtures, particularly faucet spouts and handles, can be produced by 3-D printing. The faucet components (handles and spout) can be formed so as to couple to standard faucet underbodies, standard valve platforms, and standard threaded (or other) hose/waterway connections. That is, since no real changes to other components of the faucet are required, the new fixtures can be used with existing valving and mounting fixations.

Some of the spout embodiments contain multiple channels through which water can diverge from a common inlet at the base of the faucet and converge near the outlet of the faucet before an optional aerator. Faucets with such divergent and convergent water channels can provide complex geometries such as, for example, interwoven net-like patterns that would be impossible to produce via conventional processes. As the mixed water can be fed through multiple channels, the cross-sectional area of each segment can be relatively small and still provide for acceptable flow rates through the faucet.

In exemplary embodiments according to the present invention, various 3-D printing techniques may be used. For example, for all metal plumbing products, direct metal laser sintering may be used, as described, for example, here: http://www.atlanticprecision.com/dmls/, or for example, Electron Beam Additive Manufacturing (EBAM) Technology, as described, for example, here http://www.sciaky.com/additive-manufacturing/electron-beam-additive-manufacturing-technology. Other techniques and processes may be used as may be desirable or useful. Additionally, non-metallic, and mixed metallic materials and feed-stocks may alternatively be used, as described below. With such materials, in some embodiments, a stereo-lithography, or SLA process, may be used.

In one embodiment, using direct metal laser sintering, the channels can be created during the 3-D printing process by selective sintering of the outer walls. The fabrication process can include provision of suitable controls and/or parameters, such as, for example, for the sintering process, to adjust for design requirements, such as temperature, angles of the various geometric structures, etc. For example, for the exemplary faucet spout of FIG. 2, made by the inventors hereof using a direct metal laser sintering process, in some embodiments, the multiple channels making up the lattice should slant upwards form the horizontal at an angle of at least 45 degrees. If flatter angles are used, the faucet spout can collapse on itself while being fabricated. It is noted that such parameters are generally process dependent. The angles used are thus imposed by constraints of the actual 3-D printer, or 3-D printing process, and not the support requirements of the plumbing product itself. It is also noted, however, that even in an exemplary 3-D printing process using direct metal laser sintering used by the inventors to create the faucets of FIGS. 2 and 12, by changing the orientation of the plumbing product in the machine, one can create constructions having angles with the horizontal that are smaller than 45 degrees.

Thus, in other 3-D fabrication processes, for example, different constraints may be imposed, and different parameters for the 3-D printing possible. For example, in the EBAM or SLA technologies described above, these angular minima may not be operative.

In exemplary embodiments of the present invention wherein a direct metal laser sintering process is used, remaining non-sintered metallic powder from the 3-D printing process can be removed as a post-treatment with a stream of pressurized fluid. Internal channels can, for example, be further treated and/or cleared with acid etching and/or abrasive slurries. Preferred materials for 3-D printing are stainless steels, INCONEL, brass, bronze, or other application-suitable corrosion resistant materials.

In exemplary embodiments of the present invention, there will be limits on the cross-sectional area (or diameter) of a given channel, and also on the aggregate cross-sectional area of all of the multiple channels, in a given plumbing product. These limits are a function of assumed operating pressure, and number of channels overall. For example, in plumbing products with several multiple channels, such as are shown, for example, in FIGS. 2 and 6-13, (i) the cross-sectional area of any one channel should have at least an average 1 mm diameter (it being noted that the cross-sectional areas of the water channels need not be, and in general are not, perfect circles), and (ii) the aggregate cross-sectional area of all of the individual channels should not be less than about 7 or 8 mm$^2$. In some embodiments, to allow for pressure variation and possible long term buildup of sludge on the inside of water channels, the aggregate cross-sectional area of all of the individual channels may be set at not less than about 12 mm$^2$, to ensure a margin of error.

Further parameters may be imposed by the 3-D printing process used. Thus, where a sintering process is used, the channel inner diameter must be such to as to be able to remove excess powder. Thus, in some embodiments a minimum average diameter of about 3-4 mm may be set. In other processes, such as, for example, an SLA process, where there is no powder to remove after fabrication (only wax which can easily be melted away), such minima are not necessary, and only considerations of minimum average diameter for water flow are of concern, as described above.

As noted above, a plumbing fixture need not be restricted to metals, or in fact, to any one material. It is understood that any suitable material, or combination of materials, that can be used as the feedstock for a 3-D printer that can harden may be used. These materials may include, for example, polycarbonate, PVC, acrylics, rigid polyolefins, PET, carbon fiber, AES, etc., where a non-metallic plumbing product is needed or desired.

Additionally, multi-media 3-D printing is now becoming a workable technology. Thus, in some embodiments, mixed metallic-plastic items, using various combinations of metals and transparent plastics may be fabricated using the disclosed techniques. For example, in some embodiments a plastic water channel may be used, which is plated on the outside for aesthetic reasons with a metal, such as chrome or nickel, for example. Or, for example, the inner channel which the water contacts may be metallic, and the metallic channel surrounded by a plastic or transparent sleeve.

In exemplary embodiments of the present invention, spouts and handles can be post-processed using many of the same techniques used for finishing the cast brass components used in conventional faucet production. Water supply connections and waterways can be attached by machining threads or other connection fittings (e.g., direct sweated copper pipe). Surfaces can be buffed, polished, chrome plated, PVD plated, powder coated, etc. In products made of metals, the use of highly corrosion resistant alloys such as stainless steels and INCONEL allows for attractive, aesthetically pleasing finishes to be obtained by simple buffing and polishing of the printed surface. As current 3-D printing technologies can produce metal parts at greater than 99% theoretical density, such polished components will be relatively free of surface irregularities and have an aesthetic appearance similar to that of conventionally processed faucets finished with chrome plating. Selective buffing and polishing of certain features on the faucet spot and handle can be used to create a two-tone effect, which can be desirable in some constructions.

Accordingly, 3-D printing processes can be leveraged to fabricate faucets, particularly faucet components, embodying novel intricate geometric features that can include multiple water channels (e.g., convergent and/or divergent) that would otherwise be impossible to form via conventional methods. Different channel angles and sizes can be specified to create various novel, structurally sound, constructions.

It should be understood that the multi-channel faucet geometries can be defined by the spout itself—no tubes or the like encased in sleeves, or even central piping, for example, are necessary or desirable.

It should be appreciated that, in addition to fabricating faucets, 3-D printing can also be leveraged to fabricate other metallic fittings, embodying complex geometries conventionally unrealizable, such as trip levers for toilets, knobs for cabinetry, bath fittings, shower heads, etc.

As noted above, to successfully create functional water passages for faucets using metal 3-D printing technology, the water passage should be sufficiently unobstructed to allow water flow. Thus, in exemplary embodiments of the present invention, the following minimum geometry parameters should be adhered to:

1. water passages should be reasonably clear of any support structure and material, including any residual material from the operative 3-D printing process;
2. unsupported connecting angles of the water passages should be optimized for structural integrity—e.g., to reduce the number of supports needed for printing;
3. water passage cross-sectional areas in the aggregate should be at least about 7 mm$^2$; and
4. each individual water passage should have an average diameter of about at least 1 mm in diameter.

If the plumbing product is to be used with a pressure booster, or in a building or installation where internal water pressure is boosted, and one need not assume only municipal water pressure is available, then the parameters 3 and 4 may be further relaxed, as appropriate, given the actual driving pressure of the faucet.

Next described are the various figures and the exemplary constructions and features they illustrate and embody.

Figure 1B:
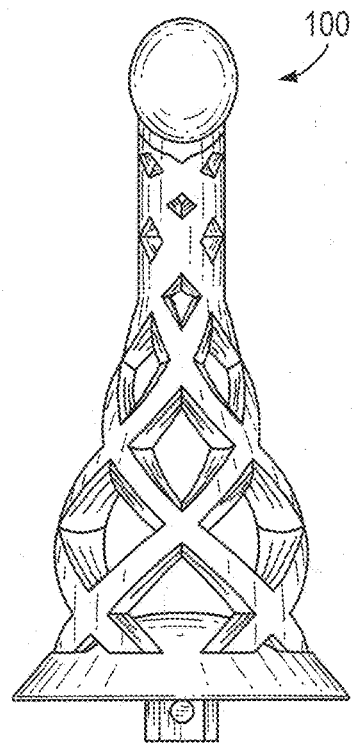
Figure 1C:
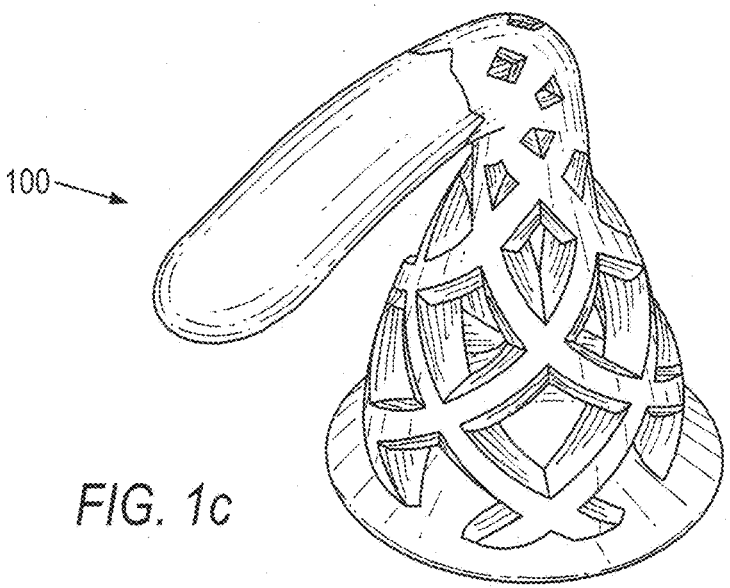

FIGS. 1a-1c depict a faucet handle 100 according to an embodiment of the present invention; and FIGS. 2a-2c depict a matching faucet spout 200. This is an exemplary lattice type construction, where multiple channels diverge and converge to define a diamond-like shape. In other embodiments, the corners of that shape may be rounded, or the shape itself a circle, ellipse, or the like. The matching handles may include a scaled down version of the shape defined in the lattice, itself using multiple channels, or it may echo the lattice defined shape in less identical ways.

Figures 3, 4:
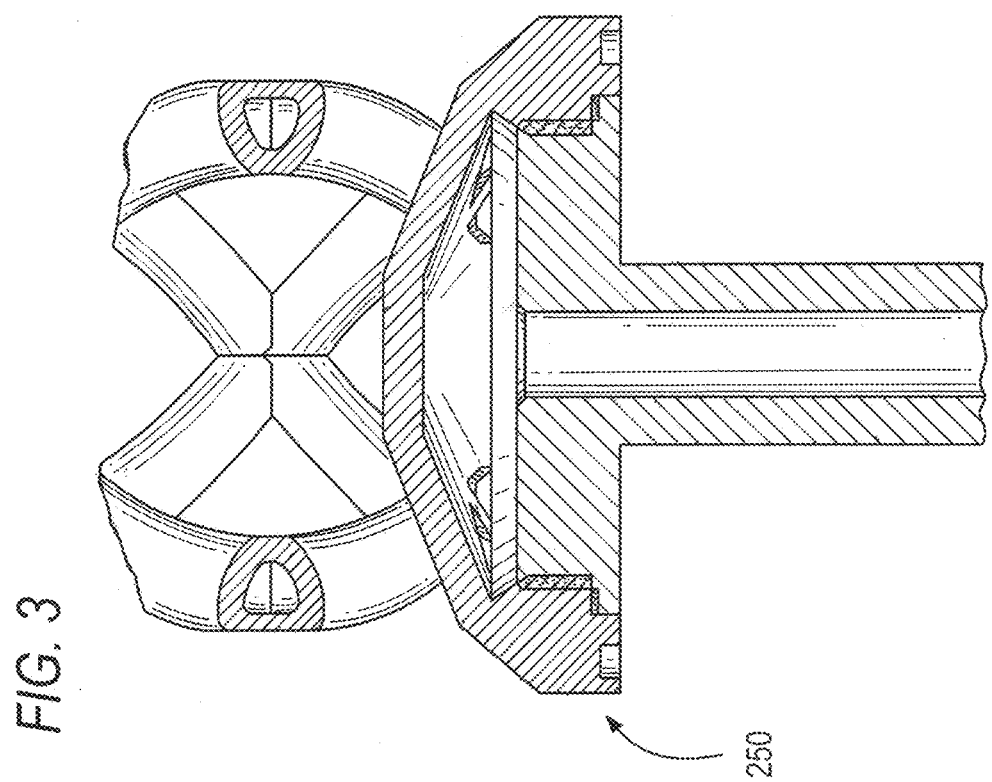
FIG. 3 is a cross-sectional view of an exemplary faucet spout mounting for the faucet spout of FIGS. 2a-2c according to an embodiment of the present invention.
FIG. 4 is a cross-sectional view of the handle mounting for the exemplary handles of FIG. 1 according to an embodiment of the present invention.

FIG. 3 depicts an exemplary faucet spout mounting 250 for the faucet spout of FIGS. 2a-2c.

FIG. 4 is a cross-sectional view of the handle mounting 275 for the exemplary handles of FIG. 1.

Figure 5A:
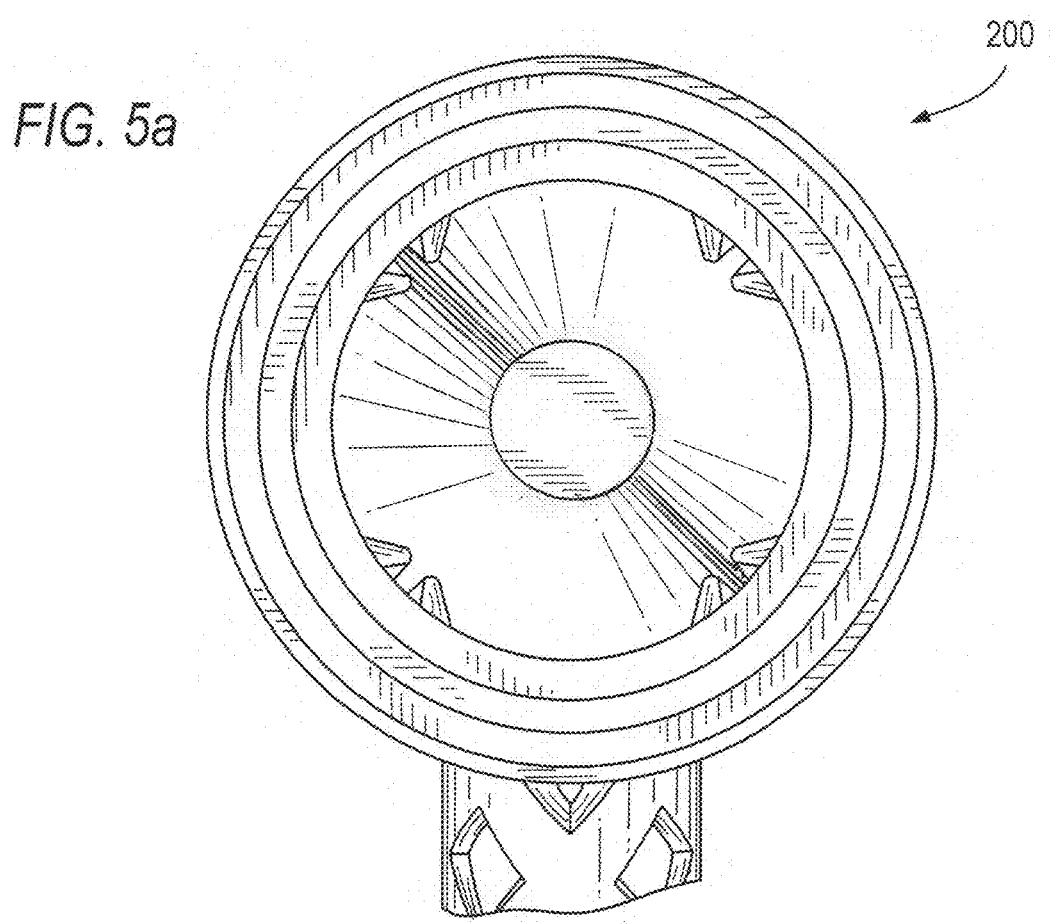
FIG. 5a is a bottom view of the exemplary spout of FIG. 2b showing detail of the water chamber and waterways.
Figure 5B:
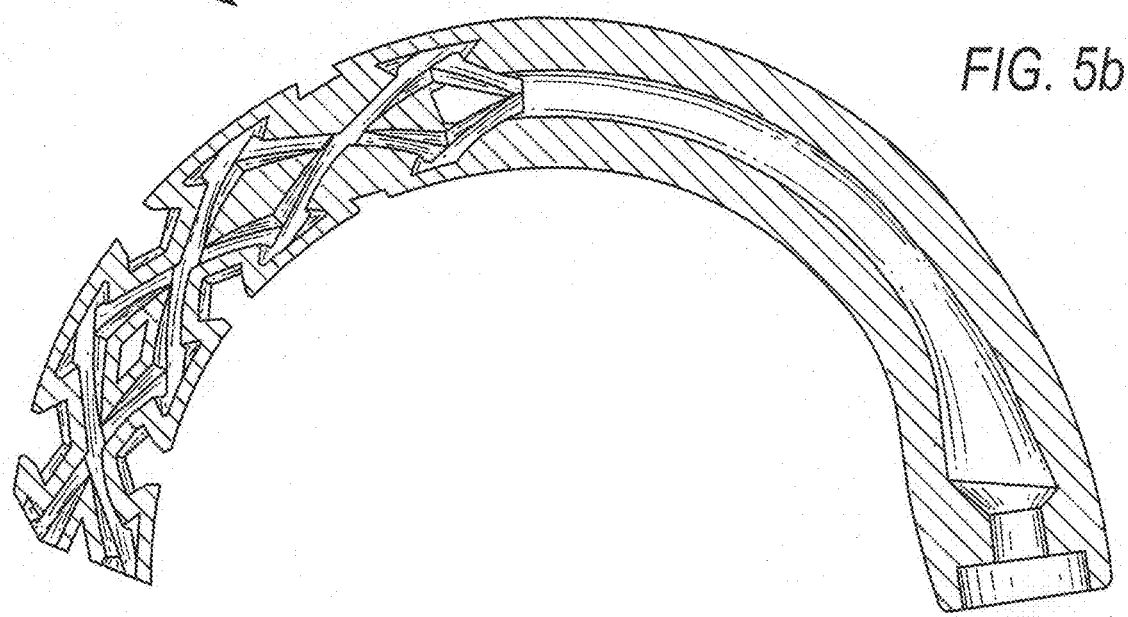
FIG. 5b is a cross-sectional side view of the exemplary spout of FIG. 2b showing detail of the waterways leading to the spout end.

FIG. 5a is a bottom view of spout 200 of FIG. 2b, showing the water chamber and waterways detail; and FIG. 5b illustrates a side view of spout 200 showing detail of the waterways leading to the spout end. In variant embodiments, the multiple channels may converge at the end, near the actual exit point of the water, as may be desired. As is noted with reference to FIGS. 2a-2c and 5a-5b, the shapes defined by the lattice can become progressively smaller towards the distal end of the spout, as the multiple channels necessarily are now closer to each other as they define the spout tubular shape. This is to preserve the cross-sectional area of the actual channels to maintain unobstructed flow.

Figure 6:
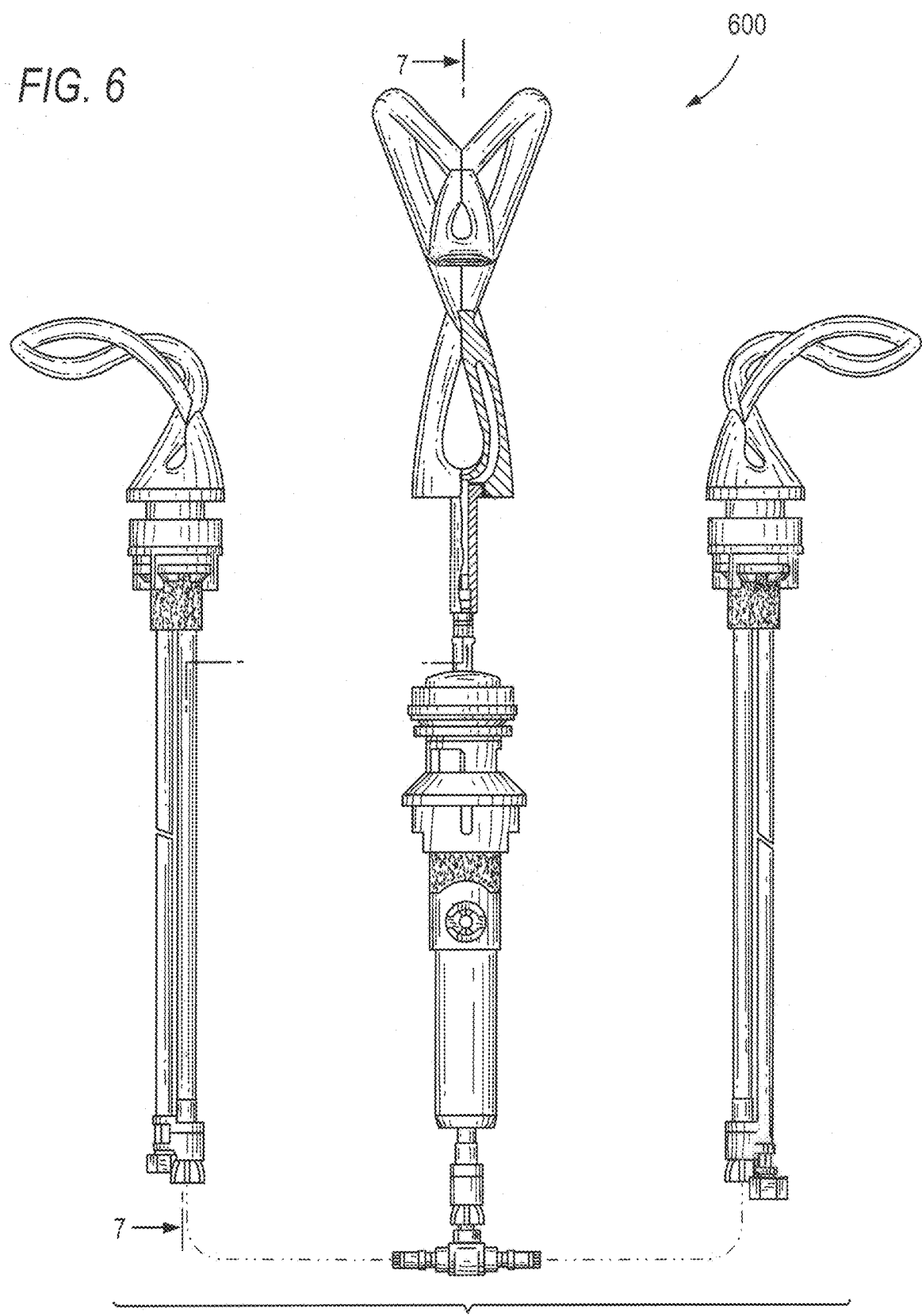
FIG. 6 shows front views of an alternate faucet system (spout and handles) according to an exemplary embodiment of the present invention, including below-deck connections and a partial cross-sectional view of a portion of the waterways.
Figure 7:
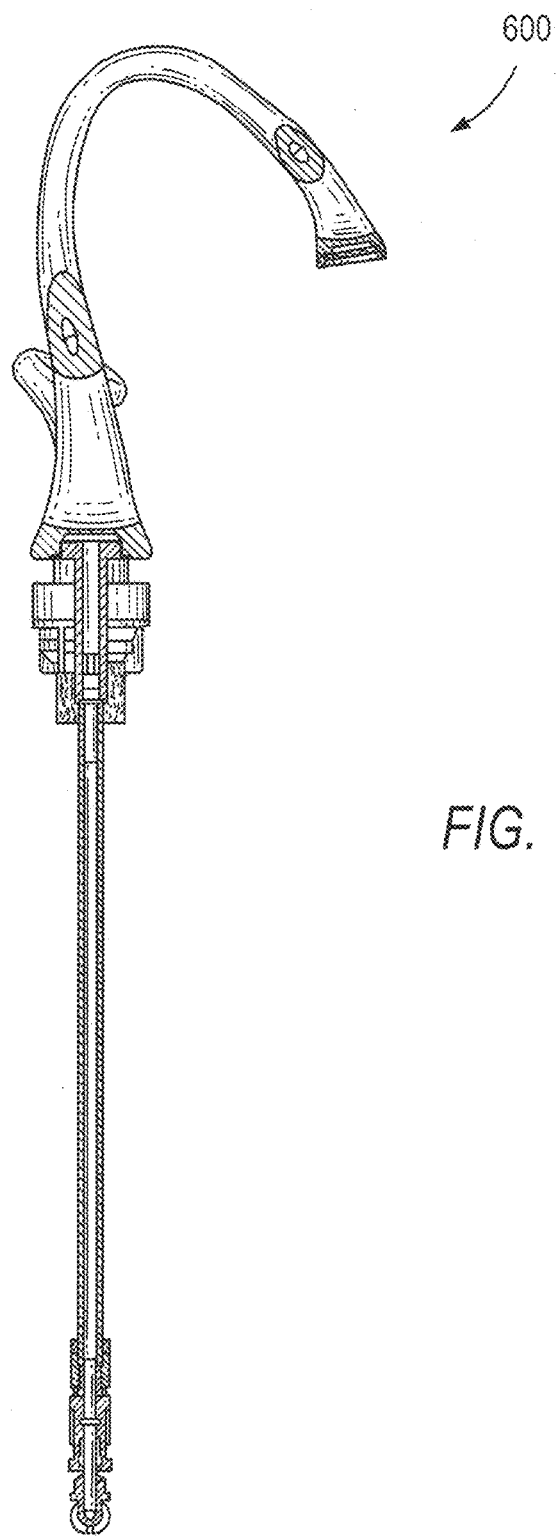
FIG. 7 is a partial side view of the spout of FIG. 6 along section 7-7 of FIG. 6.

FIG. 6 illustrates an alternate faucet 600 according to an exemplary embodiment of the present invention, including the faucet connections that are provided below the faucet deck. Here, the channels diverge once, and then re-converge above, in a "bow" shape. Thus, the two channels are much larger in diameter than, for example, the multiple channels of the embodiment of FIGS. 1-2. FIG. 7 is a partial side view of the spout of faucet 600 of FIG. 6.

Figure 8A:
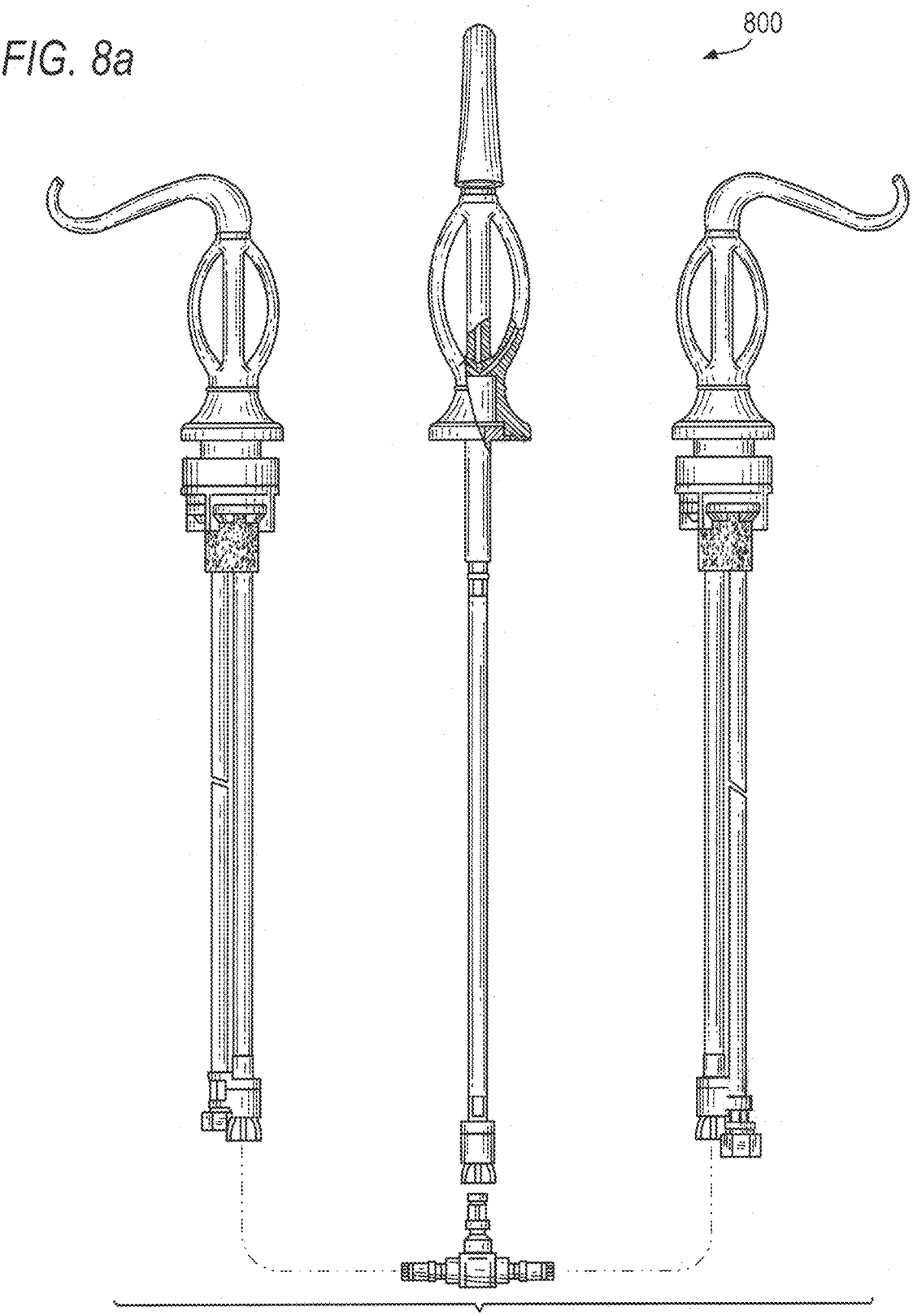
FIG. 8a shows front views of alternate faucet components according to an exemplary embodiment of the present invention, including below-deck connections and a partial cross-sectional view of the faucet body.
Figure 8B:
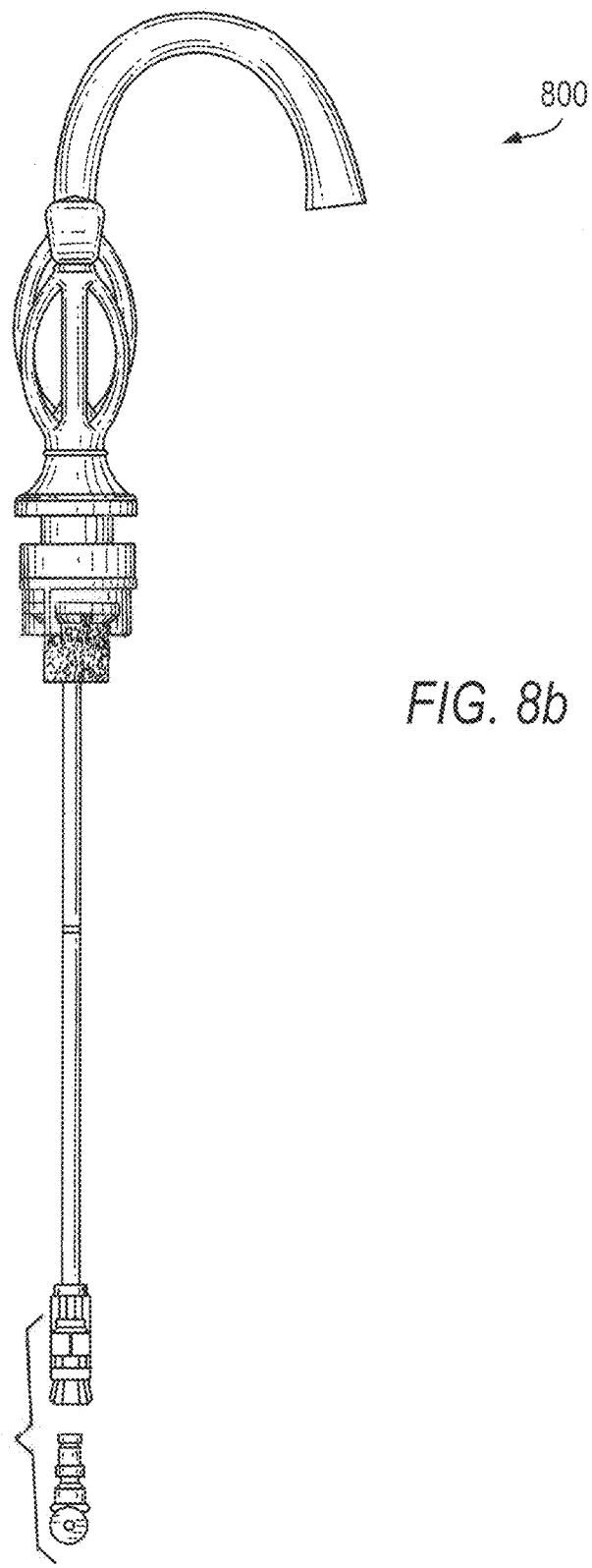

FIG. 8a illustrates a further alternate faucet 800 according to an exemplary embodiment of the present invention, including the below-deck connections; and FIG. 8b depicts a side view of faucet 800. Here, there are four channels that diverge at the bottom of the faucet, and then each protrudes upwardly along a defined radius of curvature, and re-converge at the top. This construction may be modified in various ways, such as by varying the radius of curvature, the number of arms or channels, and the ultimate height of the multiple channel portion of the faucet.

Figure 10A:
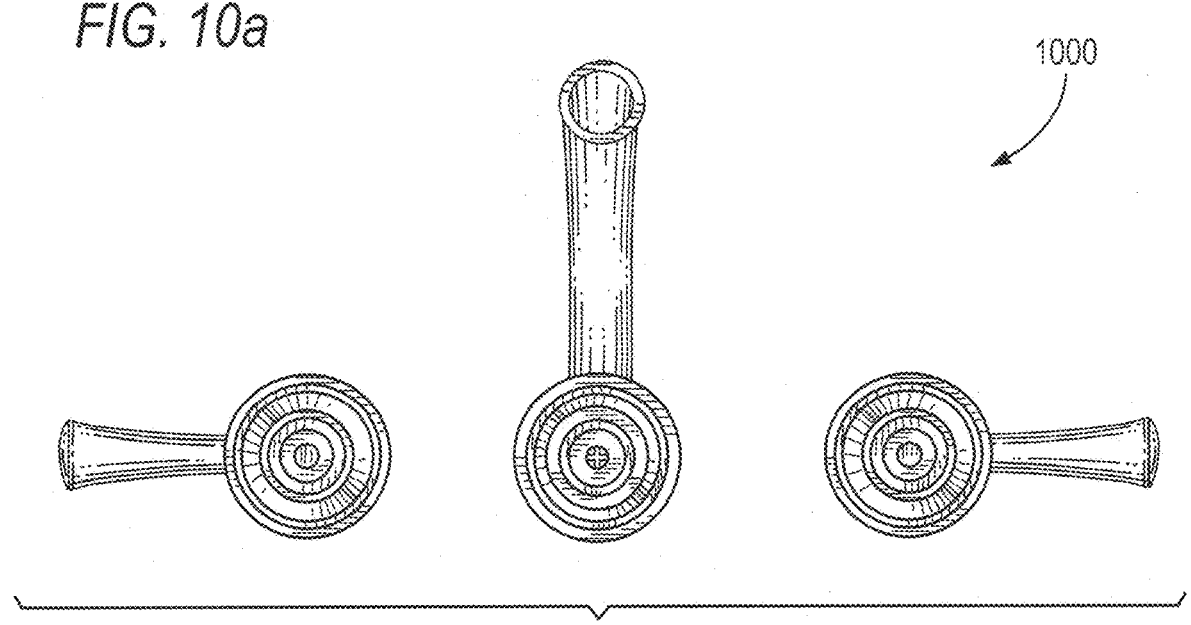
Figure 10B:
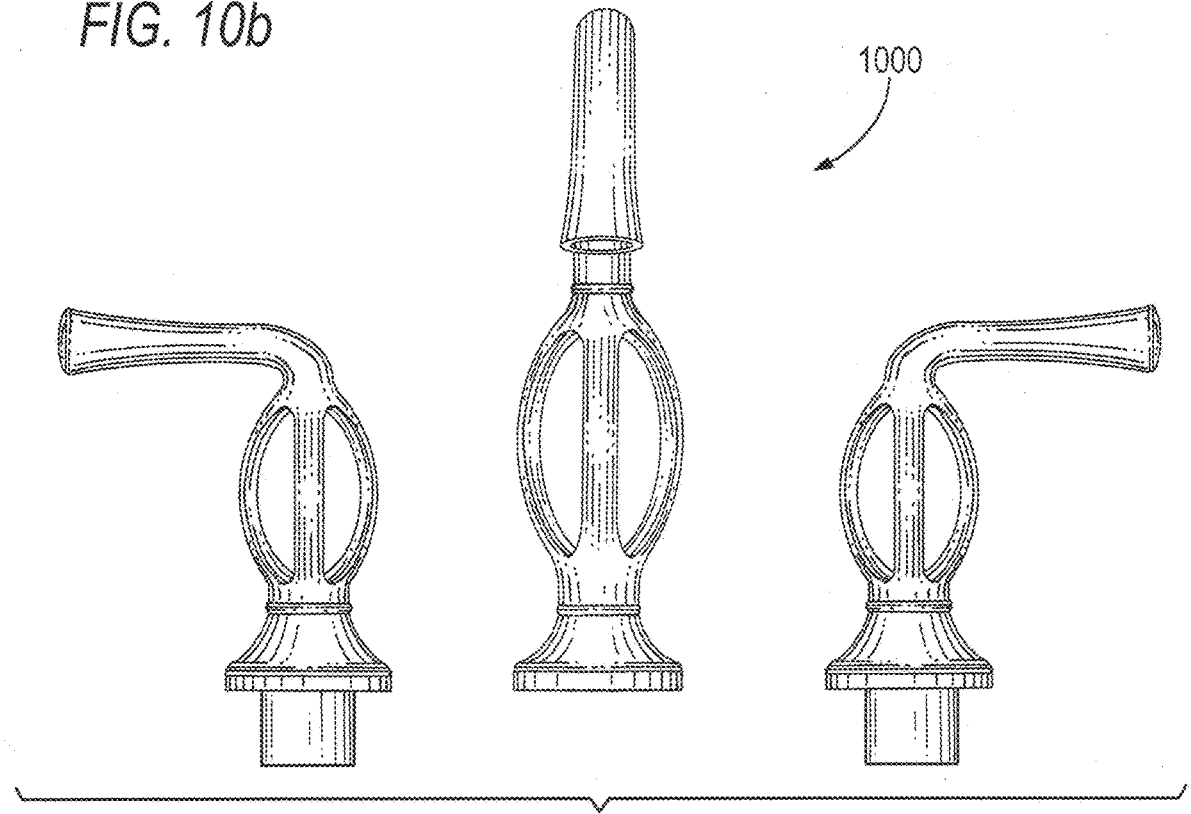

Jumping now to FIGS. 10a-10c, these depict, with respect to the faucet handles, a variation (faucet 1000) of the faucet shown in FIGS. 8a and 8b.

Figure 9A:
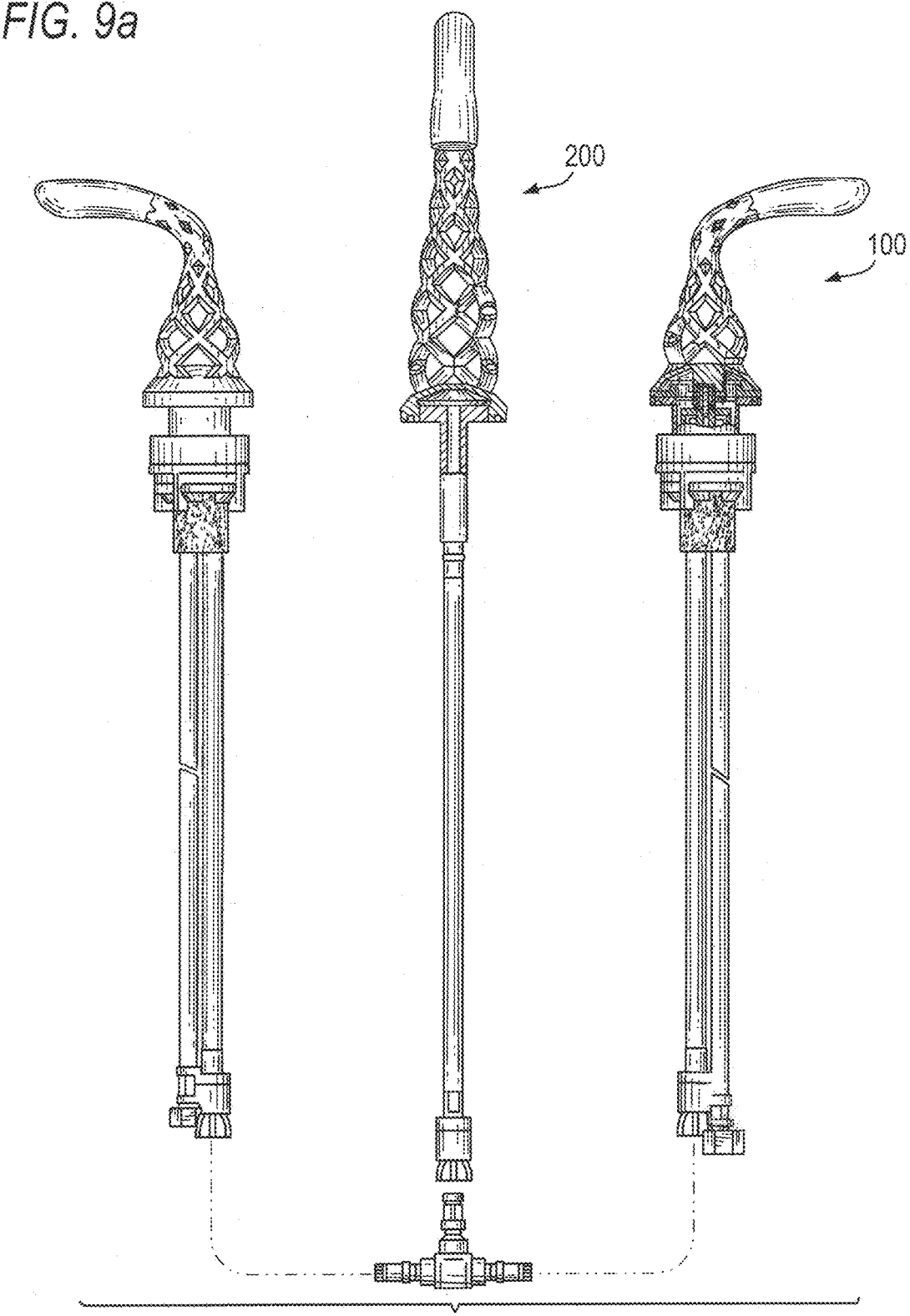
FIG. 9a depicts detail of below-deck connections for the exemplary faucet system (spout and handles) of FIGS. 1a-1c and 2a-2c.
Figure 9B:
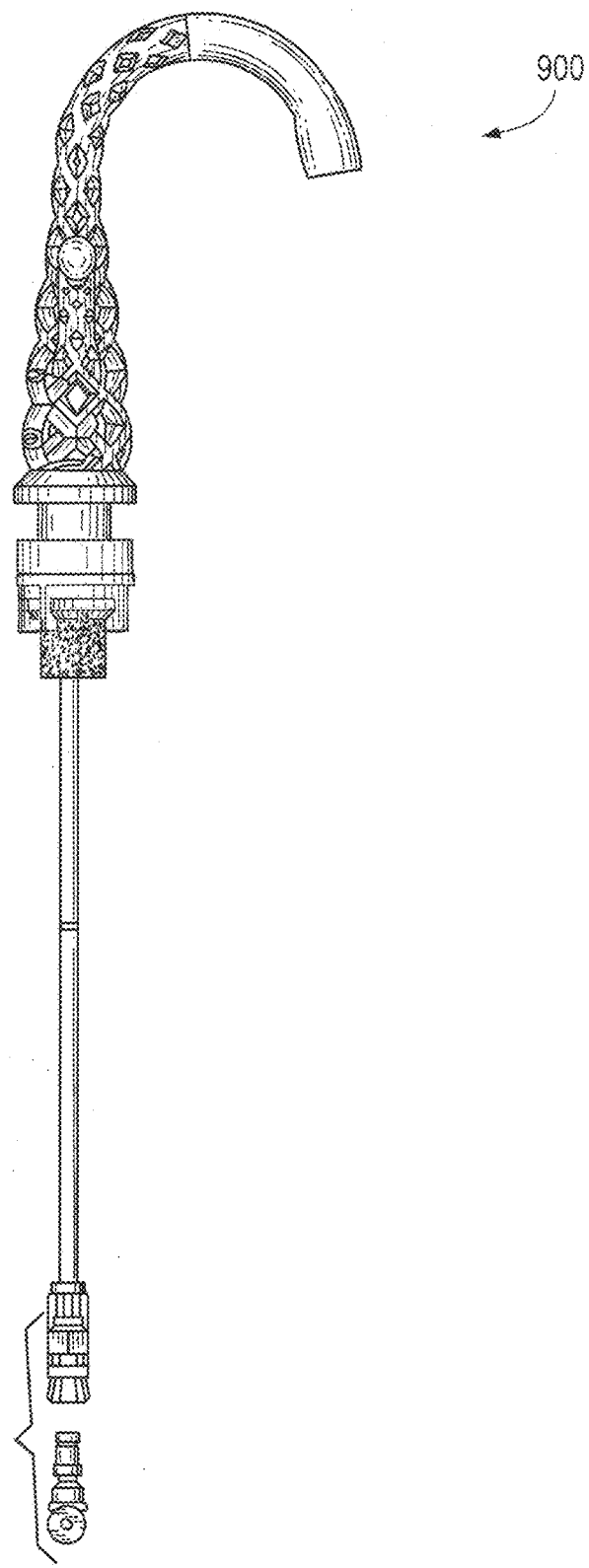

Turning now to FIG. 9a, detail is provided of the below-deck connections for an exemplary faucet 900, including spout 200 and handles 100 of FIGS. 1 and 2; and FIG. 9b is a side view of faucet 900 of FIG. 9a.

FIGS. 11a-11c illustrate yet another multiple channel faucet 1100—here, with the multiple channels running essentially in parallel to create a "bundle" appearance, as the base of a waterfall type faucet that ejects water so that it rises vertically, and then descends in a parabola trajectory.

Figure 12A:
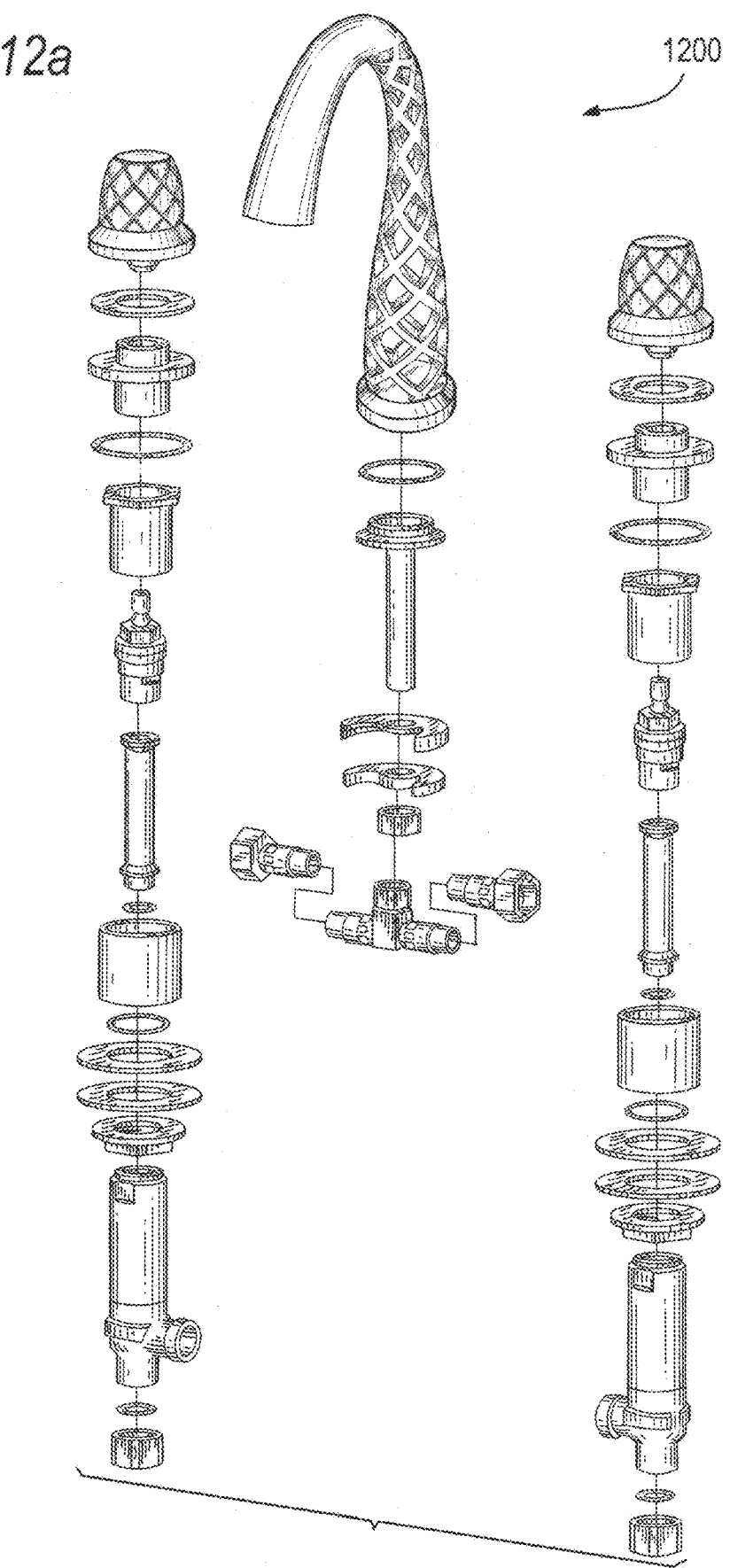
FIG. 12a is an exploded view of a variation of the faucet system of FIGS. 9a and 9b, where the handles echo the lattice construction of the spout.
Figure 12B:
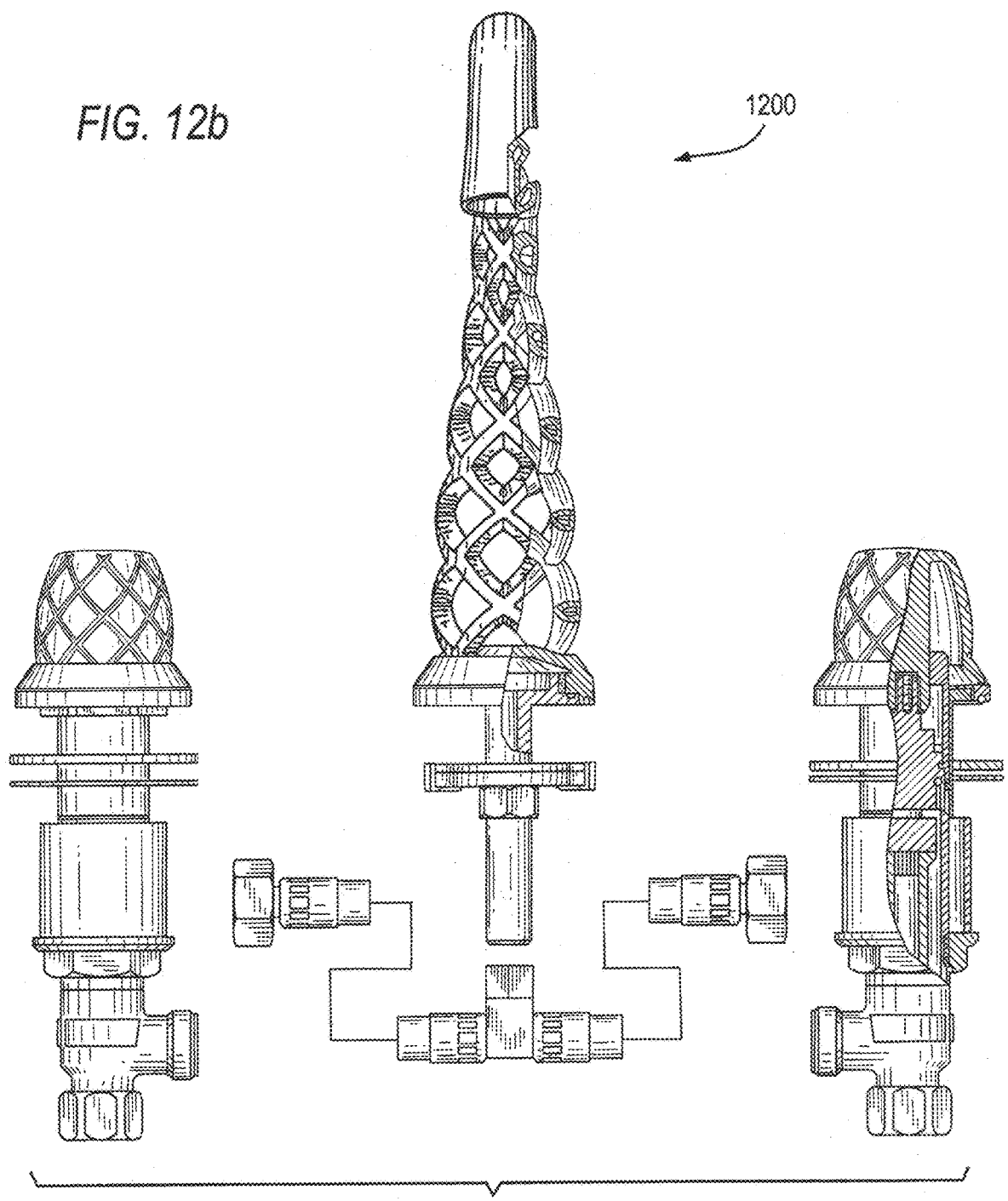
FIG. 12b is a front view of the faucet system of FIG. 12a including a partial cross-sectional view of the spout and a handle.
Figure 12C:
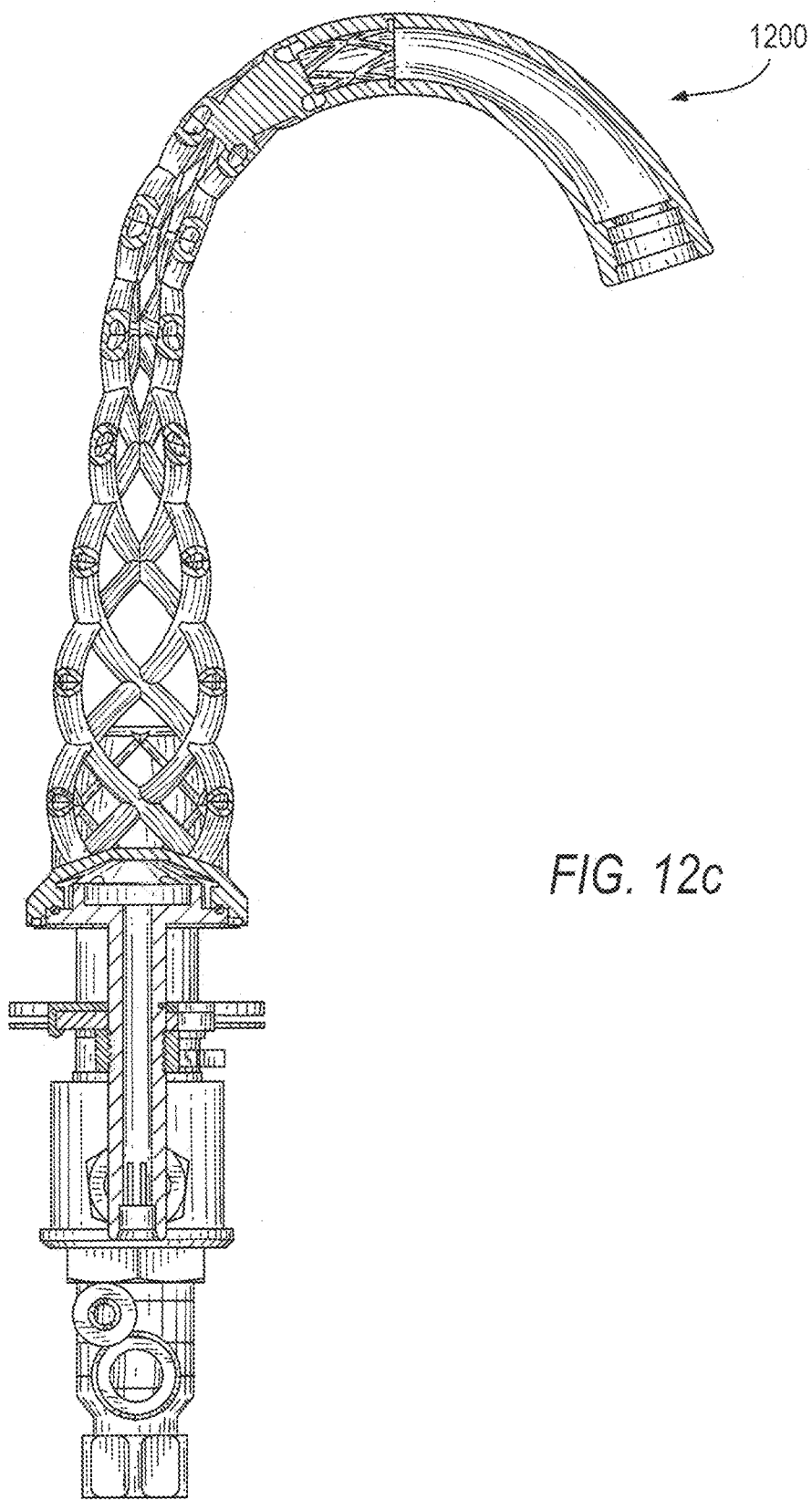
FIG. 12c is a cross-sectional side view of the spout of FIG. 12b.

FIGS. 12a-12c depict various views of a faucet 1200 that is a variation of faucet 900. Here, the handles echo the lattice of the spout.

Figure 13A:
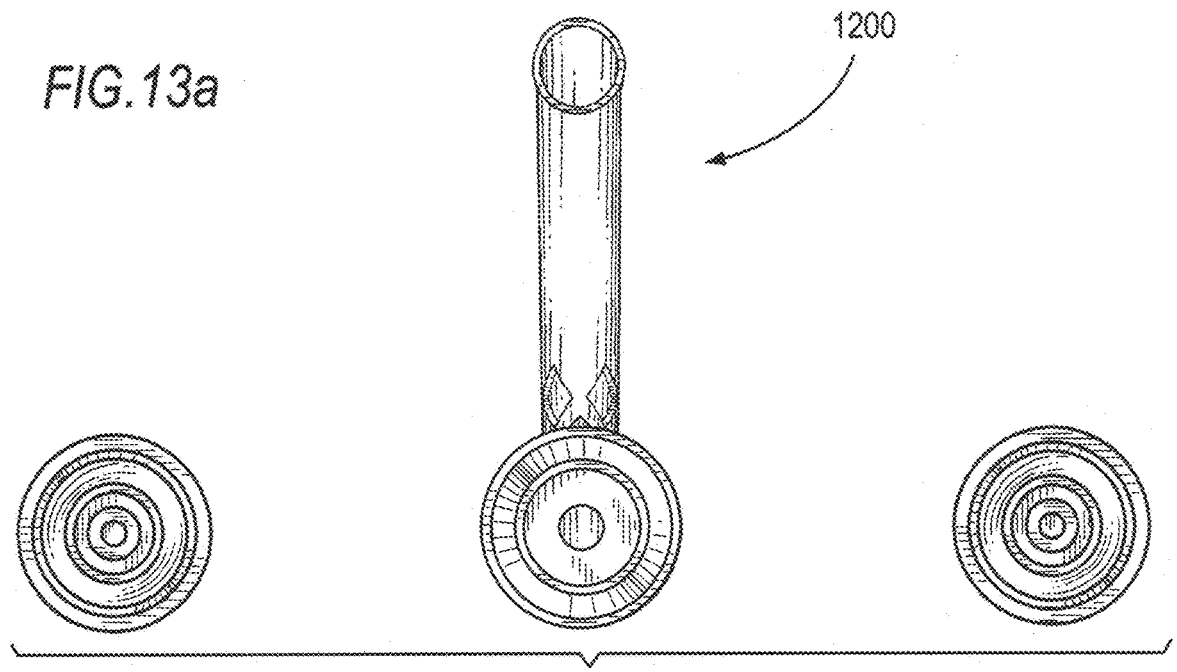
Figure 13B:
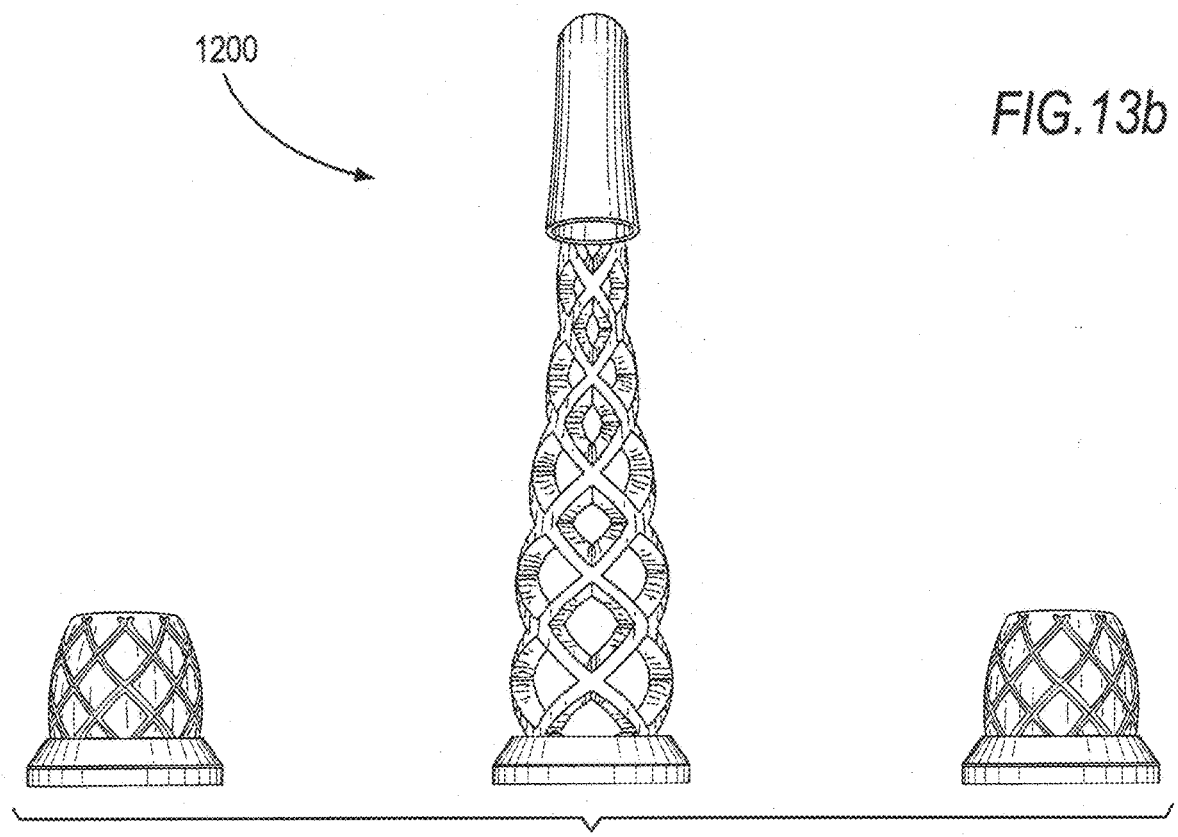

Finally, FIGS. 13a-13c depict additional views of faucet 1200.

It will thus be seen that the aspects, features and advantages made apparent from the foregoing are efficiently attained and, since certain changes may be made without departing from the spirit and scope of the invention, it is intended that all matter contained herein shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A faucet, comprising:
  a water chamber;
  a plurality of water channels fluidly connected to the water chamber, wherein each of the plurality of water channels is configured to transport water from a respective water inlet proximate to the water chamber to a respective water outlet;
  wherein the plurality of water channels forms a base portion of the faucet configured to transport water upward from the respective water inlets through the base portion;
  wherein the plurality of water channels forms a spout portion of the faucet configured to transport water downward through the spout portion toward the respective water outlets;
  wherein a first channel of the plurality of channels terminates, at its respective water outlet, in the spout portion of the faucet, at a first vertical height, and
  wherein a second channel of the plurality of channels terminates, at its respective water outlet, in the spout portion of the faucet, at a second vertical height lower than the first vertical height.

2. The faucet of claim 1, the first channel and second channel are configured such that water dispensed from the outlet of the first channel flows over and along an upper surface of an outer wall of the second channel.

3. The faucet of claim 1, wherein the plurality of water channels comprise six water channels.

4. The faucet of claim 1, wherein the components of the faucet are formed so as to couple to standard faucet underbodies, standard valve platforms, or standard threaded hose/waterway connections.

5. The faucet of claim 1, wherein a cross-sectional area of all of the plurality of water channels in aggregate is greater than or equal to about 7 mm$^2$.

6. The faucet of claim 1, wherein the average diameter of the plurality of water channels is greater than or equal to about 1 mm.

7. The faucet of claim 1, wherein the faucet is formed of one or more of stainless steels, INCONEL, brass, or bronze, by metallic 3-D printing.

8. The faucet of claim 7, wherein the faucet is formed by selective sintering of the outer walls of one or more of the channels.

9. The faucet of claim 1, wherein the spout portion of the faucet is in the shape of a parabolic arc.

10. The faucet of claim 1, wherein each of the plurality of water channels is configured to output water into a single combined water stream.

11. The faucet of claim 1, wherein the plurality of water channels are collectively formed as a unitary metal component.

* * * * *